(12) United States Patent
Gutowitz

(10) Patent No.: US 8,200,865 B2
(45) Date of Patent: Jun. 12, 2012

(54) EFFICIENT METHOD AND APPARATUS FOR TEXT ENTRY BASED ON TRIGGER SEQUENCES

(75) Inventor: Howard Andrew Gutowitz, New York, NY (US)

(73) Assignee: Eatoni Ergonomics, Inc., Brooklyn, NY (US)

( * ) Notice: Subject to any disclaimer, the term of this patent is extended or adjusted under 35 U.S.C. 154(b) by 0 days.

(21) Appl. No.: 10/605,157

(22) Filed: Sep. 11, 2003

(65) Prior Publication Data
US 2005/0060448 A1    Mar. 17, 2005

(51) Int. Cl.
    G06F 3/023    (2006.01)
    G06F 3/02     (2006.01)
    H03K 17/94    (2006.01)
    H03M 11/00    (2006.01)

(52) U.S. Cl. ............ 710/67; 710/65; 710/73; 341/20; 341/22; 341/23; 341/26; 341/28; 345/156; 345/168; 345/171; 700/83; 700/84

(58) Field of Classification Search ............ 710/65–67, 710/73; 341/20–28; 345/156, 168, 171; 707/3; 700/83–84

See application file for complete search history.

(56) References Cited

U.S. PATENT DOCUMENTS

| | | |
|---|---|---|
| 3,833,765 A | 9/1974 | Hilborn et al. |
| 3,929,216 A | 12/1975 | Einbinder |
| 4,058,795 A | 11/1977 | Balm |
| 4,360,892 A | 11/1982 | Endfield |
| 4,447,692 A | 5/1984 | Mierzwinski |
| 4,475,013 A | 10/1984 | Lee et al. |
| 4,522,518 A | 6/1985 | Schmidt |
| 4,555,193 A | 11/1985 | Stone |
| 4,608,457 A | 8/1986 | Fowler et al. |
| 4,615,629 A | 10/1986 | Power |
| 4,650,927 A | 3/1987 | James |
| 4,674,112 A | 6/1987 | Kondraske et al. |
| 4,677,659 A | 6/1987 | Dargan |
| 4,679,951 A | 7/1987 | King et al. |

(Continued)

FOREIGN PATENT DOCUMENTS

AU    760655    5/2003

(Continued)

OTHER PUBLICATIONS

Dick Penn; "User Interface Design Principles"; Sep. 2001, Postive Interaction Inc. http//positiveinteraction.com/carleton/2001Principles.ppt.

(Continued)

*Primary Examiner* — Tanh Nguyen

(57) ABSTRACT

Languages based in whole or in part on ideographic characters such as Chinese, Japanese, and Korean, are often are entered in a computerized text-entry system in a two-phase process. In the first phase, symbols from a first pre-conversion set are entered, then in the second phase, these pre-conversion symbols are converted into a second set of post-conversion symbols. This invention teaches a method and apparatus for the automatic conversion of pre-conversion symbols into post-conversion symbols without requiring an explicit conversion signal to be input by the user. It accomplishes this goal though the design of trigger sequences of keystrokes which are substantially functionally equivalent to an explicit conversion signal input by the user. An apparatus constructed according to the trigger sequence method is particularly well adapted for use on reduced keyboards, and in conjunction with predictive text-entry methods. Explicit constructions are shown for Chinese, Japanese, and Korean.

15 Claims, 26 Drawing Sheets

U.S. PATENT DOCUMENTS

| | | | |
|---|---|---|---|
| 4,680,572 A | 7/1987 | Meguire et al. | |
| 4,715,736 A | 12/1987 | McGunnigle | |
| 4,737,980 A | 4/1988 | Curtin et al. | |
| 4,754,474 A | 6/1988 | Feinson | |
| 4,775,255 A | 10/1988 | Langley | |
| 4,791,556 A | 12/1988 | Vilkaitis | |
| 4,817,129 A | 3/1989 | Riskin | |
| 4,836,700 A | 6/1989 | Jensen | |
| 4,866,759 A | 9/1989 | Riskin | |
| 5,003,503 A | 3/1991 | Lapeyre | |
| 5,031,206 A | 7/1991 | Riskin | |
| 5,040,479 A | 8/1991 | Thrash | |
| 5,087,910 A | 2/1992 | Guyot-sionnest | |
| 5,097,425 A | 3/1992 | Baker et al. | |
| 5,128,672 A | 7/1992 | Kaehler | |
| 5,175,803 A | 12/1992 | Yeh | |
| 5,200,988 A | 4/1993 | Riskin | |
| 5,210,689 A | 5/1993 | Baker et al. | |
| 5,255,310 A | 10/1993 | Kim et al. | |
| 5,288,158 A | 2/1994 | Matias | |
| 5,297,041 A | 3/1994 | Kushler et al. | |
| 5,305,238 A | 4/1994 | Starr et al. | |
| 5,332,322 A | 7/1994 | Gambaro | |
| 5,339,358 A | 8/1994 | Danish et al. | |
| 5,367,298 A | 11/1994 | Axthelm | |
| 5,392,338 A | 2/1995 | Danish et al. | |
| D357,011 S | 4/1995 | Paull et al. | |
| D357,476 S | 4/1995 | Paull et al. | |
| 5,410,333 A | 4/1995 | Conway | |
| 5,432,510 A | 7/1995 | Matthews | |
| D362,432 S | 9/1995 | Paull et al. | |
| 5,458,425 A | 10/1995 | Torok | |
| 5,469,160 A | 11/1995 | Yang et al. | |
| 5,473,346 A | 12/1995 | Pollack | |
| 5,479,536 A | 12/1995 | Comerford | |
| 5,487,616 A | 1/1996 | Ichbiah | |
| 5,497,151 A | 3/1996 | Dombroski | |
| 5,507,021 A | 4/1996 | Siegle | |
| 5,515,305 A | 5/1996 | Register et al. | |
| 5,535,119 A | 7/1996 | Ito et al. | |
| 5,535,421 A | 7/1996 | Weinreich | |
| 5,543,818 A | 8/1996 | Scott | |
| 5,559,512 A | 9/1996 | Jainski et al. | |
| 5,574,482 A | 11/1996 | Niemeier | |
| 5,575,576 A | 11/1996 | Roysden | |
| 5,581,243 A | 12/1996 | Ouellette et al. | |
| 5,625,354 A | 4/1997 | Lerman | |
| 5,627,566 A | 5/1997 | Litschel | |
| 5,659,769 A * | 8/1997 | Kida et al. | 715/530 |
| 5,661,476 A | 8/1997 | Wang et al. | |
| 5,661,505 A | 8/1997 | Livits | |
| 5,661,605 A | 8/1997 | Conway | |
| 5,664,896 A | 9/1997 | Blumberg | |
| 5,675,329 A | 10/1997 | Barker et al. | |
| 5,675,819 A | 10/1997 | Schuetze | |
| 5,724,449 A | 3/1998 | Comerford | |
| 5,724,457 A | 3/1998 | Fukushima | |
| 5,734,749 A | 3/1998 | Yamada et al. | |
| 5,745,056 A | 4/1998 | Takahashi et al. | |
| 5,748,177 A | 5/1998 | Baker et al. | |
| 5,748,512 A | 5/1998 | Vargas | |
| 5,790,103 A | 8/1998 | Willner | |
| 5,793,312 A | 8/1998 | Tsubai | |
| 5,797,098 A | 8/1998 | Schroeder et al. | |
| 5,809,415 A | 9/1998 | Rossmann | |
| 5,818,437 A | 10/1998 | Grover et al. | |
| 5,828,991 A | 10/1998 | Skiena et al. | |
| 5,847,697 A | 12/1998 | Sugimoto | |
| 5,859,599 A | 1/1999 | Shiga | |
| 5,861,821 A | 1/1999 | Kato et al. | |
| 5,880,685 A | 3/1999 | Weeks | |
| 5,896,321 A | 4/1999 | Miller et al. | |
| 5,903,630 A | 5/1999 | Collins | |
| 5,911,485 A | 6/1999 | Rossmann | |
| 5,936,555 A | 8/1999 | Zagnoev | |
| 5,936,557 A | 8/1999 | Liddle | |
| 5,945,928 A | 8/1999 | Kushler et al. | |
| 5,950,809 A | 9/1999 | Andre | |
| 5,952,942 A | 9/1999 | Balakrishnan et al. | |
| 5,953,541 A | 9/1999 | King et al. | |
| 5,959,629 A | 9/1999 | Masui | |
| 5,963,671 A | 10/1999 | Comerford et al. | |
| 5,982,303 A | 11/1999 | Smith | |
| 5,982,351 A | 11/1999 | White et al. | |
| 5,984,548 A | 11/1999 | Willner et al. | |
| 5,990,890 A | 11/1999 | Etheredge | |
| 5,993,089 A | 11/1999 | Burrell, IV | |
| 6,004,049 A | 12/1999 | Knox | |
| 6,005,495 A | 12/1999 | Connolly et al. | |
| 6,005,498 A * | 12/1999 | Yang et al. | 341/23 |
| 6,011,554 A | 1/2000 | King et al. | |
| 6,037,942 A | 3/2000 | Millington | |
| 6,043,761 A | 3/2000 | Burrell, IV | |
| 6,047,196 A | 4/2000 | Makela | |
| 6,047,300 A | 4/2000 | Walfish et al. | |
| 6,054,941 A | 4/2000 | Chen | |
| 6,088,220 A | 7/2000 | Katz | |
| 6,121,960 A | 9/2000 | Carroll et al. | |
| 6,130,628 A | 10/2000 | Schneider-Hufschmidt et al. | |
| 6,150,962 A | 11/2000 | Rossmann | |
| 6,160,536 A | 12/2000 | Forest | |
| 6,172,625 B1 | 1/2001 | Jin et al. | |
| 6,181,328 B1 | 1/2001 | Shieh et al. | |
| 6,184,803 B1 | 2/2001 | Burrell, IV | |
| 6,219,731 B1 | 4/2001 | Gutowitz | |
| 6,232,892 B1 | 5/2001 | Burrell, IV | |
| 6,232,956 B1 | 5/2001 | Mailman | |
| D443,615 S | 6/2001 | Kirchner | |
| 6,243,460 B1 | 6/2001 | Bhagavatula | |
| 6,262,716 B1 | 7/2001 | Raasch | |
| 6,271,835 B1 | 8/2001 | Hoeksma | |
| 6,286,064 B1 | 9/2001 | King et al. | |
| 6,295,052 B1 | 9/2001 | Kato et al. | |
| 6,295,509 B1 | 9/2001 | Driskell | |
| 6,307,548 B1 | 10/2001 | Flinchem et al. | |
| 6,307,549 B1 | 10/2001 | King et al. | |
| 6,356,258 B1 | 3/2002 | Kato et al. | |
| 6,359,572 B1 | 3/2002 | Vale | |
| 6,405,060 B1 | 6/2002 | Schroeder et al. | |
| 6,492,977 B1 | 12/2002 | Marshall | |
| 6,587,675 B1 | 7/2003 | Riddiford | |
| 6,636,162 B1 | 10/2003 | Kushler et al. | |
| 6,646,573 B1 * | 11/2003 | Kushler et al. | 341/28 |
| 6,661,404 B1 | 12/2003 | Sirola et al. | |
| 6,703,963 B2 | 3/2004 | Higginson | |
| 6,734,881 B1 | 5/2004 | Will | |
| 6,765,504 B2 * | 7/2004 | Ouyang | 341/28 |
| 6,771,191 B2 | 8/2004 | Motoe | |
| 6,885,317 B1 | 4/2005 | Gutowitz | |
| 6,900,794 B1 | 5/2005 | San | |
| 6,903,723 B1 | 6/2005 | Forest | |
| 7,440,889 B1 * | 10/2008 | Skiena et al. | 704/9 |
| 7,761,175 B2 | 7/2010 | Gutowitz et al. | |
| RE43,082 E | 1/2012 | Gutowitz | |
| 2001/0011271 A1 | 8/2001 | Takahashi et al. | |
| 2001/0040550 A1 | 11/2001 | Vance et al. | |
| 2002/0044814 A1 | 4/2002 | King et al. | |
| 2002/0196163 A1 | 12/2002 | Bradford et al. | |
| 2003/0006956 A1 | 1/2003 | Wu et al. | |
| 2004/0165924 A1 | 8/2004 | Griffin | |
| 2004/0247362 A1 | 12/2004 | King et al. | |
| 2006/0190256 A1 | 8/2006 | Stephanick et al. | |

FOREIGN PATENT DOCUMENTS

| | | |
|---|---|---|
| AU | 2005325740 B2 | 8/2006 |
| CA | 2353862 | 11/2007 |
| CA | 2354155 | 10/2010 |
| CN | 1218233 C | 9/2005 |
| DE | 3235752 A1 | 3/1984 |
| EP | 28533 A2 | 5/1981 |
| EP | 66991 A2 | 5/1981 |
| EP | 279555 A2 | 8/1988 |
| EP | 319193 A2 | 6/1989 |
| EP | 364112 A2 | 4/1990 |
| EP | 201294 B1 | 7/1991 |
| EP | 213022 B1 | 9/1991 |
| EP | 457077 A2 | 11/1991 |

| | | | |
|---|---|---|---|
| EP | 595114 A1 | 5/1994 | |
| EP | 651315 A1 | 5/1995 | |
| EP | 544123 A3 | 4/1997 | |
| EP | 779759 A3 | 6/1997 | |
| GB | 2299884 A | 10/1996 | |
| GB | 2343414 A1 | 5/2000 | |
| JP | 9128134 A2 | 5/1997 | |
| JP | 10177446 A2 | 6/1998 | |
| JP | 10207601 A2 | 8/1998 | |
| JP | 10207608 A2 | 8/1998 | |
| JP | 11272403 A2 | 10/1999 | |
| WO | WO 85/01596 A1 | 4/1985 | |
| WO | WO 89/02369 A1 | 3/1989 | |
| WO | WO 91/03782 A1 | 3/1991 | |
| WO | WO 92/12491 A1 | 7/1992 | |
| WO | WO 94/06139 A1 | 3/1994 | |
| WO | WO 95/18405 A1 | 7/1995 | |
| WO | WO 96/02394 A1 | 2/1996 | |
| WO | WO 96/27947 A1 | 9/1996 | |
| WO | WO 96/30822 A1 | 10/1996 | |
| WO | WO 97/05541 A1 | 2/1997 | |
| WO | WO 97/30386 A1 | 8/1997 | |
| WO | WO 98/08688 A1 | 3/1998 | |
| WO | WO 98/09270 A1 | 3/1998 | |
| WO | WO 98/16055 A1 | 4/1998 | |
| WO | WO 98/33110 A1 | 7/1998 | |
| WO | WO 98/33111 A1 | 7/1998 | |
| WO | WO 99/15951 A1 | 4/1999 | |
| WO | WO 99/30222 A1 | 6/1999 | |
| WO | WO 00/08547 A1 | 2/2000 | |
| WO | WO 00/35091 A | 6/2000 | |
| WO | WO-0034880 | 6/2000 | |
| WO | WO 2005/026897 A2 | 3/2005 | |
| WO | 2006080927 A1 | 8/2006 | |
| WO | WO-2008034112 A2 | 3/2008 | |
| ZA | 2001/4509 | 9/2002 | |

OTHER PUBLICATIONS

D.S. Blough; "Pigeon perception of letters of the alphabet"; Science Oct. 22, 1982; 218(4570) 397-8 (abstract).

Dedre Gentner; "Structure-Mapping: A Theoretical Framework for Analogy"; Cognitive Science 7, pp. 155-170 (1983).

Ronald Ferguson (2000); "Modeling Orientation Effects in Symmetry Detection"; Proc. 22nd Cog. Sci. Soc. Erlbaum, Pub.

Pedro Felzenszwalb; "Representation and Detection of Deformable Shapes"; to appear in the IEEE Transactions of Pattern Analysis and Machine Intelligence.

Scott Berkun; "The Myth of Discoverability"; Essays on web design interaction, usability experience architecture, etc.; No. 26, www.ulweb.com/issues/issue26.htm (undated).

A. Chris Long et al; "Visual Similarity of Pen Gestures"; to appear in Proceedings of Human Factors in Computing Systems (SIGGHI '00).

Robert Goldstone; "Similarity"; in R.A. Wilson & F.C. Keil (eds.) MIT encyclopedia of the cognitive sciences. (pp. 763-765), Cambridge, MA.

Eric Weisstein; "Affine Transformation"; from MathWorld—A Wolfram Web Resource. Http//mathworld.wolfram.com/AffineTransformation.html.

Robert Goldstone and J. Yun Son; "Similarity"; The Cambridge Handbook of Thinking and Reasoning; Eds: Keith Holyoak, Robert Morrison, Cambridge University Press, In Press.

D.Blough; "The Perception of Similarity"; in Avian Visual Cognition; E: Robert G. Cook. http//www.pigeon.psy.tufts.edu/avc/toc.htm (Sep. 2001).

Erich Goldmeier; "Similarity in Visually Perceived Forms"; Psychology Issues vol. VIII/No. 1, Monograph 29, International Universities Press (1972).

Jean Mark Gowron; "Groups, Modular Arithmetic, and Cryptography"; Linguistics; San Diego State University ; www.rohan.sdsu.edu/-gawron; Jul. 24, 2004.

J.P. Davis; "Let your fingers do the spelling"; disambiguating words spelled with the telephone keypad, Avros Journal; 9:53-66; Mar. 1991.

"U.S. Appl. No. 09/856,863, Notice of Allowance mailed Nov. 30, 2004", 4 pgs.

"U.S. Appl. No. 09/856,863, Preliminary Amendment mailed May 24, 2001", 143 pgs.

"U.S. Appl. No. 11/814,769, Final Office Action mailed Dec. 22, 2010", 10 pgs.

"U.S. Appl. No. 11/814,769, Non Final Office Action mailed Jul. 9, 2010", 9 pgs

"U.S. Appl. No. 11/814,769, Response filed Apr. 13, 2011 to Final Office Action mailed Dec. 22, 2010", 17 pgs.

"U.S. Appl. No. 11/814,769, Response filed Oct. 6, 2010 to Non Final Office Action mailed Jul. 9, 2010", 16 pgs.

"U.S. Appl. No. 11/814,769, Appeal Brief filed Sep. 30, 2011", 29 pgs.

"U.S. Appl. No. 11/814,769, Examiner's Answer mailed Dec. 6, 2011 to Appeal Brief filed Sep. 30, 2011", 12 pgs.

"International Application Serial No. PCT/USO4/29115, Search Report mailed Oct. 14, 2005", 1 pg.

"International Application Serial No. PCT/USO4/29115, Written Opinion mailed Oct. 14, 2005", 4 pgs.

Gutowitz, Howard Andrew, "Efficient Merger of Telephone Keypad and Typewriter Keyboard Conventions", U.S. Appl. No. 60/844,592, (filed Sep. 14, 2006), 93 pgs.

Gutowitz, Howard Andrew, et al., "Keypads Row Similar to a Telephone Keypad", U.S. Appl. No. 60/905,054, (filed Mar. 5, 2007), 55 pgs.

Gutowitz, Howard Andrew, et al., "Row Similar Extensions of Telephone Keypads", U.S. Appl. No. 60/932,449, (filed May 31, 2007), 73 pgs.

Gutowitz, Howard Andrew, et al., "Row Similar Extensions of Telephone Keypads", U.S. Appl. No. 60/958,775. (filed Jul. 9, 2007), 105 pgs.

Gutowitz, Howard Andrew, et al., "Row Similar Extensions of Telephone Keypads", U.S. Appl. No. 60/962,267, (filed Jul. 27, 2007), 95 pgs.

Gutowitz, Howard Andrew, "Keyboard Comprising Swipe-Switches Performing Keyboard Actions", U.S. Appl. No. 61/270,843, (filed Jul. 14, 2009), 67 pgs.

Gutowitz, Howard Andrew, "Method and Apparatus for Accelerated Entry of Symbols on a Reduced Keyboard", U.S. Appl. No. 60/277,293, (filed Mar. 20, 2001). 44 pgs.

Gutowitz, Howard Andrew, "Apparatus for Message Triage", U.S. Appl. No. 61/587,152, (filed Jan. 17, 2012), 32 pgs.

"Nokia User's Guide", Nokia Corporation, Finland, No. 6, 1996, 100 pgs.

Belongie, Serge, et al,, "Shape Matching and Object Recognition Using Shape Contexts", IEEE Transactions on Pattern Analysis and Machine Intelligence, vol. 24, No. 24, Apr. 2002, pp. 509-522.

* cited by examiner

FIG. 6

| Aspect | First Embodiment | Second Embodiment |
|---|---|---|
| pre-conversion | variable order | fixed order |
| pre-conversion advance | Next key | multi-tap |
| tone mark | variable order | fixed order |
| conversion | on trigger sequence | on tone mark |
| post-conversion | variable order | fixed order |
| post-conversion advance | Next key | multi-tap |
| predictive method | symbol-based | word-based |

FIG. 7

| Aspect | First Embodiment | Second Embodiment |
|---|---|---|
| pre-conversion | | fixed order |
| pre-conversion advance | | multi-tap |
| tone mark | | fixed order |
| conversion | | on tone mark |
| post-conversion | | fixed order |
| post-conversion advance | | multi-tap |
| predictive method | symbol-based | word-based |

PRIOR ART

FIG. 9

| Aspect | First Embodiment | Second Embodiment |
|---|---|---|
| pre-conversion | variable order | fixed order |
| pre-conversion advance | Next key | multi-tap |
| tone mark | | fixed order |
| conversion | | on tone mark |
| post-conversion | variable order | fixed order |
| post-conversion advance | Next key | multi-tap |
| predictive method | symbol-based | word-based |

PRIOR ART

FIG. 10

| Aspect | First Embodiment | Second Embodiment |
|---|---|---|
| pre-conversion | variable order | fixed order |
| pre-conversion advance | Next key | multi-tap |
| tone mark | variable order | |
| conversion | | on tone mark |
| post-conversion | variable order | fixed order |
| post-conversion advance | Next key | multi-tap |
| predictive method | symbol-based | word-based |

FIG. 11

| Aspect | First Embodiment | Second Embodiment |
|---|---|---|
| pre-conversion | variable order | fixed order |
| pre-conversion advance | Next key | multi-tap |
| tone mark | variable order | fixed order |
| conversion | on trigger sequence | |
| post-conversion | variable order | fixed order |
| post-conversion advance | Next key | multi-tap (if pre-conversion advance is Next key) |
| predictive method | symbol-based | word-based |

FIG. 12

| Aspect | First Embodiment | Second Embodiment |
|---|---|---|
| pre-conversion | variable order | |
| pre-conversion advance | Next key | |
| tone mark | variable order | |
| conversion | on trigger sequence | |
| post-conversion | variable order | |
| post-conversion advance | Next key | |
| predictive method | symbol-based | word-based |

FIG. 15

1520 — 刚　才你提到的
1510 — gang1　cai2　ni3　ti2　dao4　de5
1500 — 426N41　2C242　643　842N　3264　335

1550 — 第　二　个　问　题
1540 — di4　er4　ge4　wen4　ti2
1530 — 344　3C74　434　9NN364　842CC

FIG. 16

| | | |
|---|---|---|
| 1621 → | 3 | d ← 1641 |
| 1622 → | 34 | dg ← 1642 |
| 1623 → | 344 | dh ← 1643 |
| 1624 → | 3444 | di ← 1644 |
| 1625 → | 3444T | di ← 1645 |
| 1626 → | 3444T4 | dig ← 1646 |
| 1627 → | 3444T44 | dih ← 1647 |
| 1628 → | 3444T444 | dii ← 1648 |
| 1629 → | 3444T4444 | di4 ← 1649 |
| 1630 → | 3444T44443 | 地d ← 1650 |
| 1631 → | 3444T44443C | 第d ← 1651 |

FIG. 17

| | | A | I | U | E | O |
|---|---|---|---|---|---|---|
| 1 | | あ | い | う | え | お |
| 2 | K | か | き | く | け | こ |
| 3 | S | さ | し | す | せ | そ |
| 4 | T | た | ち | つ | て | と |
| 5 | N | な | に | ぬ | ね | の |
| 6 | H | は | ひ | ふ | へ | ほ |
| 7 | M | ま | み | む | め | も |
| 8 | Y | や | | ゆ | | よ |
| 9 | R | ら | り | る | れ | ろ |
| 0 | W | わ | ゐ | | ゑ | を ん |

FIG. 19

| | | | |
|---|---|---|---|
| 1901 | 1 | あ | 1921 |
| 1902 | 15 | あに | 1922 |
| 1903 | 15N | あの | 1923 |
| 1904 | 15N6 | あの へ | 1924 |
| 1905 | 15N6N | あのは | 1925 |
| 1906 | 15N6NN | あの ひ | 1926 |
| 1907 | 15N6NN4 | あの ひ と | 1927 |
| 1908 | 15N6NN45 | あの ひ と な | 1928 |
| 1909 | 15N6NN45N | あの ひ と に | 1929 |
| 1910 | 15N6NN45N4 | あの 人 に て | 1930 |
| 1911 | 15N6NN45N4C | あの 人 に て | 1931 |

FIG. 20

| | |
|---|---|
| 2 | いろはにほへと |
| 3 | ちりぬるを |
| 4 | わかよたれそ |
| 5 | つねならむ |
| 6 | うゐのおくやま |
| 7 | けふこえて |
| 8 | あさきゆめみし |
| 9 | ゑひもせすん |

| | | |
|---|---|---|
| 2301 | 8 | あ 2321 |
| 2302 | 86 | あの 2322 |
| 2303 | 869 | あのす 2323 |
| 2304 | 869N | あのも 2324 |
| 2305 | 869NN | あのひ 2325 |
| 2306 | 869NN2 | あのひと 2326 |
| 2307 | 869NN22 | あのひとい 2327 |
| 2308 | 869NN22H | あのひとに 2328 |
| 2309 | 869NN22H7 | あの人にて 2329 |
| 2310 | 869NN22H7C | あの人にて 2330 |

EFFICIENT METHOD AND APPARATUS FOR TEXT ENTRY BASED ON TRIGGER SEQUENCES

CROSS REFERENCE TO RELATED APPLICATIONS

U.S. Pat. No. 6,219,731 Apr. 17, 2001, PCT/US99/29,346, Method and apparatus for improved multi-tap text input, PCT/US01/30,264, EPO 01983089.2-2212-US0130264, Method and apparatus for accelerated entry of symbols on a reduced keypad. U.S. provisional Ser. 60/111,665, PCT/US99/29,343, WIPO WO 00/35091. Touch-typable devices based on ambiguous codes and methods to design such devices.

BACKGROUND OF INVENTION

Text entry is a labor-intensive process. As is well known, when computers are used for entry of languages which depend in whole or in part on ideographic characters, part of the labor is pressing a "convert" key to cause pre-conversion symbols which have been previously input into post-conversion ideographic characters. If it were possible to assign each of the ideographic characters to a separate key, there would be no need for pre-conversion symbols or a conversion process. The need for these arises because the number of keys on a practical text entry device is small compared to the potentially tens of thousands of ideographic characters which must be input. The large set of ideographic characters is input by representing them as sequences of pre-conversion symbols drawn from a smaller set, and then performing conversions of the sequences to the desired ideographic characters. The problem of a reduced number of keys compared to the number of characters to be input is exacerbated in the case of small handheld devices such as mobile telephones. On these devices, the number of keys may be smaller even than the number of pre-conversion symbols. The result is that the user is required to perform multiple keystrokes to input each pre-conversion character a keystroke to cause conversion, and then further keystrokes to specify which of the post-conversion characters is intended to be input. The resulting number of keystrokes can be quite high, even for short samples of text.

Predictive text methods have been employed to reduce the number of keystrokes required to enter pre-conversion symbols or post-conversion symbols, or both. Some of these methods such as those described in U.S. Pat. No. 6,219,731 Apr. 17, 2001, PCT/US99/29,346 method and apparatus for improved multi-tap text input, PCT/US01/30,264, EPO 01983089.2-2212-US0130264, Method and apparatus for accelerated entry of symbols on a reduced keypad, U.S. provisional Ser. No. 60/111,665, PCT/US99/29,343, WIPO WO 00/35091, Touch-typable devices based on ambiguous codes and methods to design such devices, all of which are hereby incorporated by reference, perform predictions on a symbol-by-symbol basis, or based on contexts composed of whole words or parts of words. Most prior art systems, such as those described in Davis, J. R. Let your fingers do the spelling: Implicit disambiguation of words spelled with the telephone keypad, Avios Journal 9 (1991), 57-66, perform predictions on dictionaries of whole words.

The availability of these predictive designs as well as their commercial success show that there is a strongly felt industrial need for text-entry mechanisms which reduce the labor involved in text entry as well as possible. A heretofore unaddressed need is to reduce not only the number of keystrokes involved in input of pre-conversion and post-conversion symbols, but also the keystrokes involved in performing the conversion function which relates the pre- and post-conversion symbols. The present invention substantially eliminate conversion keystrokes. Surprisingly, it does so in a way that maintains the advantages of predictive text methods as applied to pre-conversion symbols, post-conversion symbols, or both. Further advantages accrue to its parsimonious demands for computer memory and processing power, making it suitable for implementation in small and/or handheld devices.

SUMMARY OF INVENTION

In order to particularly point out and distinctly claim the subject matter for which patent protection is hereby sought, we will define some terms to be used in the disclosure of the invention, and its best modes of operation. The sequence of these definitions also serves as a systematic introduction to the subject matter of the invention.

Printable and non-printable symbols. A printable symbol is a symbol which is displayed as text in normal writing. For instance, the letter a in English is a printable symbol. In the following it will be useful to also consider non-printable symbols. For example, the delete button may be said to generate the non-printable "delete" symbol. This terminology is consistent with most standard encoding systems for computerized entry of text. Note: For the sake of readability, the terms "letter" and "alphabet" may be used interchangeably with the term "symbol" and "set of symbols" respectively unless a distinction between these terms is explicitly drawn.

Display. A printable symbol may be displayed in the course of text entry. By display we mean "presentation to the senses of the user." In typical applications of the present invention, the display would be visual, and for the sake of concreteness in this disclosure, visual display is assumed. However, the display might be an auditory display in the case of interactive voice response systems, tactile in the case of text input systems for the blind, etc.

Keys and Keystrokes. Typical text-entry systems use mechanical keys to input symbols. For the sake of concreteness, we will define a keystroke to be an atomic act of a user with the intent of inputting a symbol (printable or non-printable) using a text-entry device to express that intent. We will further define the physical means used to express the intent as a key. The physical form of both key and keystroke depends on the input device. In the case of an auditory system, the keystroke could be, for instance, spoken or signaled by a hand clap. In the case of a touch-pad system the key could be a swipe of the pad. In the case of a system based on quantum mechanics, the key could be manifest by a user-intended change in the vibrational state of a particle. The intent to input a symbol could be expressed by doing nothing at all for a certain length of time. In short, the physical manifestation of the intent to input a symbol is not a limitation on the scope of this invention.

Symbol input. In the case of familiar unambiguous typewriter keyboards, such as the Qwerty keyboard, the relationship between keystroke sequences and symbol sequence input is quite straightforward, each keystroke on a symbol key inputs a symbol. In the case of ambiguous keyboards, the relationship is more complex. Several keystrokes may be required to input a single symbol and keystrokes may be required for proper text input which in themselves do not display symbols at all or do not display symbols which appear in the output text. For instance, when using the "multi-tap" input method on a telephone keypad, three keystrokes on the 2 key are required to enter the letter c. Multi-tap keypads often have a time-out kill button, the purpose of which is to facilitate the entry of consecutive letters from the same key. Pressing the time-out kill button does not enter a printable symbol by itself, rather it serves to separate the input of distinct printable symbol.

A printable symbol will be said to be input when a keystroke sequence is entered which includes the keystrokes required to define and display the symbol given the hardware and software of the text input system, as well as a keystroke which terminates the input of the symbol, e.g. by beginning the input of a next symbol, or causing conversion, or causing termination or transmission of the entire entered text. The keystroke which terminates symbol input may be identical to a keystroke which serves to define and/or display the symbol, or the keystroke which terminates input of the symbol may serve no other function but symbol input termination. For instance, in a standard multi-tap system for a telephone keypad, one keystroke sequence to input the printable sequence ba ... begins 22T2 ... where each 2 represents a keystroke on the 2 key, and T represents a keystroke on the time-out kill key. Once the keystroke sequence 22 is entered, the letter b is displayed. However, the letter b cannot yet be said to be definitively input since another keystroke on 2 would change the display to the letter c. It is only after the non-printing symbol T is entered that the letter b can said to be input. Another keystroke sequence for inputting the printable sequence ba ... in a multi-tap system begins 22W2 ... where each 2 represents a keystroke on the 2 key, and W represents the user waiting until a time-out period has expired.

If the backspace key B were pressed after the keystroke sequence 22, then the letter b would be said to input at the moment the keystroke on the backspace key is made, since that keystroke terminates the input of the symbol, and even though the letter b would be substantially simultaneously erased by the same keystroke, and in fact might not be displayed at all in some implementations. The situation is clarified when we consider the backspace key as generating a symbol-input-end symbol in addition to an erase symbol, and a move-cursor symbol. More generally, input means display in conjunction with the generation of a symbol-input-end symbol which applies to the displayed symbol, either following or substantially simultaneously with the display. The distinction between display and input is particularly important for the appreciation of the predictive systems with conversion which are shown and described in the present disclosure.

Pre-conversion, post-conversion, and non-conversion symbols. Natural languages based in whole or in part on ideographic characters such as Chinese, Japanese, and Korean may be input into a computer in a two-phase process, each phase involving a set of symbols to be called pre-conversion and post-conversion symbols respectively. In the first phase, symbols from a pre-conversion set of symbols are input, and in a second phase these symbols are converted into the post-conversion ideographic characters. Well-known pre-conversion symbol sets for Chinese include Hanyu Pinyin (Latin letters with tone marks), other Romanizations schemes, or Zhuyin (also known as Bopomofo. In the case of Japanese, the ideographic Kanji symbols are entered by first entering strings of pre-conversion symbols typically composed of Latin letters or Hiragana, and then converted to Kanji in a second conversion phase. In the case of Korean, the pre-conversion symbols are typically Latin letters or Jamo, and the ideographic Hanja are produced in a second conversion phase. Text entry for some languages may involve symbols which are neither pre-conversion nor post-conversion symbols. For example, punctuation symbols are not typically entered with the intent of being converted to other symbols, nor are they typically the result of a conversion process. Symbols which are not converted into other symbols will be called non-conversion symbols.

Note that the characterization of a symbol as a pre-, post- or non-conversion symbol is not intrinsic to the symbol, but rather depends on the text-entry device. For instance, though in typical devices punctuation symbols are non-conversion symbols, they could be pre-conversion symbols in a device which e.g. replaces the sequence :-) with a pictorial representation of a smiling face when the punctuation sequence is entered.

cHiragana, cLatin, and cJamo symbols. Appreciation of this invention as a whole hinges on the appreciation of the distinction between display and input. Similarly, appreciation of several aspects of embodiments of the invention hinges on appreciation of the distinction between symbols meant to appear in output text as such, and symbols which may be otherwise the same, but are meant to be converted to still other symbols. cHiragana are symbols used in the preferred embodiment as applied to Japanese. According to the invention, to each Hiragana there is a corresponding cHiragana. Hiragana are distinguished from cHiragana in the preferred embodiment in that Hiragana are meant to be represented directly in output text, and are thus non-converting symbols, whereas cHiragana are pre-conversion symbols meant to be converted during the course of text entry to post-conversion Kanji symbols. In typical implementations of this invention, the cHiragana have display characteristics which mark them as distinct from Hiragana. In the same way, cLatin letters are Latin letters entered with the intent of being converted, and are marked in the display so as to distinguish them from Latin letters, and cJamo are pre-conversion symbols entered with the intent of being converted and marked distinctively from non-converting Jamo.

Trigger sequences. A central inventive step of the present invention is the creation of trigger sequences of keystrokes. Trigger sequences are sequences of keystrokes which when entered by a user cause a conversion event to take place, and serve at the same time to in-put pre-conversion and/or non-conversion symbols. By dually representing both pre-conversion symbol input and entry of a conversion signal, trigger sequences reduce the number of keystrokes required to enter text, eliminating the need for an dedicated convert keystroke as is the case for prior-art systems. According to the teachings of this invention, the conventional pre-conversion symbols may be augmented with auxiliary symbols such that suitable trigger sequences may be formed. Intuitively, an ideal trigger sequence is a sequence of keystrokes such that conversion should occur if and only if the trigger sequence is entered. That is, it should ideally be sufficient to enter a trigger sequence to cause conversion, and conversion should be a necessary consequence of entering a trigger sequence.

For this substantial identity between trigger sequences and conversion to hold, the trigger sequences should be carefully designed to reflect as well as possible the nature of conversion as it is practiced in the language. Depending on the language, the trigger sequences may be more or less complicated. We will see also that the set of pre-conversion and post-conversion symbols may have to be tailored to allow trigger sequences to be well defined. We will describe in detail the construction of trigger sequences for Chinese, Japanese, and Korean. Upon learning the details of these constructions and the general principles elucidated in the present disclosure, a person skilled in the art should have no difficulty constructing trigger sequences for other languages.

More formally, a trigger sequence comprises a sequence of at least two keystrokes such that a first of the keystrokes causes the display of a pre-conversion symbol, and a second of the keystrokes generates a symbol-in-put-end symbol and substantially simultaneously triggers conversion of at least the last pre-conversion symbol in-put.

Trigger sequences are of particular utility in the design of text-entry systems for reduced keyboards such as telephone keypads. On such reduced keyboards, the reduction in the number of keys is compensated for by increasing the number of keystrokes needed to input each symbol. Various software methods have been devised to predict the next symbol or symbols intended by the user and thus reduce the number of keystrokes. The present invention teaches another method to reduce keystrokes. It reduces or eliminates the need for keystrokes whose sole purpose is to cause conversion. It teaches a specific design strategy applicable to many languages to reduce conversion keystrokes while allowing further keystroke reduction by means of predictive software systems. Especially when used in conjunction with predictive software, the present invention can dramatically reduce the number of keystrokes required to input text in languages with conversion.

As will be developed in more detail below, in the case of Chinese, a trigger sequence may be preferably embodied as comprising a keystroke causing a tone mark to be displayed and a keystroke on any key generating a symbol-in-put-end symbol inputting the tone mark.

As will be developed in more detail below, in the case of Japanese, trigger sequences may be preferably embodied as falling into two classes. Elements of the first preferred class are characterized in that the first keystroke of the trigger sequence displays a cHiragana, and the second key of the trigger sequence generates a symbol-input-end symbol which applies to the displayed cHiragana, provided that the second keystroke is on a key to which no cHiragana has been assigned.

Elements of the second preferred class are characterized in that the first keystroke of the trigger sequence displays a cHiragana, and the second keystroke of the trigger sequence generates a symbol-input-end symbol which applies to the displayed cHiragana, and also causes a non-conversion symbol to be displayed, and a third keystroke which causes the displayed non-conversion symbol to be input.

Note that further classes could be also be defined, such as a class in which the two symbols input by the second keystroke in trigger sequences of the second preferred class are entered with two different keystrokes. Also note that these trigger sequence classes are defined in terms of cHiragana as the pre-conversion symbols. If other pre-conversion symbols are chosen, such as cLatin symbols, then trigger sequences could be defined in a similar way.

As will be developed in more detail below, in the case of Korean, trigger sequences may be preferably embodied as falling into two classes. Elements of the first preferred class are characterized in that the first keystroke of the trigger sequence displays a cJamo, and the second keystroke of the trigger sequence generates a symbol-in-put-end symbol which applies to the displayed cJamo, provided that the second keystroke is on a key to which no cJamo has been assigned.

Elements of the second preferred class are characterized in that the first keystroke of the trigger sequence displays a cJamo, and the second keystroke of the trigger sequence generates a symbol-input-end symbol which applies to the displayed cJamo, and also causes a non-conversion symbol to be displayed, and a third keystroke which causes the displayed non-conversion symbol to be input.

Note that further classes could be also be defined, such as a class in which the two symbols input by the second keystroke in trigger sequences of the second preferred class are entered with two different keystrokes. Also note that these trigger sequence classes are defined in terms of cJamo as the pre-conversion symbols. If other pre-conversion symbols are chosen, such as cLatin symbols, then trigger sequences could be defined in a similar way.

Ambiguous keyboards. An ambiguous keyboard is a keyboard designed such that several printable symbols are assigned to at least one key, and no hardware means, such as a shift key, are proto disambiguate the various printable symbols assigned to the same key.

Predictive text systems. Software which determines as a function of context which member of a set of printable symbols assigned to a given key of an ambiguous keyboard will be displayed or input in response to a keystroke.

Multi-tap. Multi-tap is a prior-art text-entry method for ambiguous keypads in which the several symbols on a given key are distinguished for input by multiple presses on the key, and in which the various symbols always appear in the same order as the key is pressed multiple times.

Next keys. A keystroke on a Next key advances in the symbol displayed as the result of a keystroke on a key with multiple symbols are assigned. Next key advance is distinguished from multi-tap advance in that in a multi-tap system the displayed symbol is advanced by repeated keystrokes on the same key which displayed the first symbol, whereas in a Next-key system, the key which advances the display is distinct from the key which displayed the symbol to be advanced. Some Next-key systems are equipped with several Next keys, each of which may advance the display of a different class of symbols.

Variable order vs. fixed order. If there is more than one symbol assigned to a key, some mechanism should be supplied to select the symbol from the key to display at any given time. If a system causes the symbols to always be displayed in the same order, such that there exists at least one symbol which cannot be displayed before some other symbol is displayed, then the system is said to be a fixed-order system. Otherwise, it is a variable-order system. Predictive text systems are variable-order systems, while the standard multi-tap system is a fixed-order system. Hybrid variable/fixed order systems are possible in which a subset of the symbols assigned to the same key are presented in a fixed order, and another subset is presented in a variable order.

OBJECTS OF THE INVENTION

An object of the invention is to permit automatic conversion from sequences of pre-conversion symbols to sequences of post-conversion symbols, automatic in the sense of not requiring the user to generate an explicit conversion signal, for instance by pressing a "convert" key, as is done in prior-art systems. This automatic conversion is of particular utility in the entry of languages such as Chinese, Japanese, or Korean, which use ideographic characters in whole or in part.

A further object of the invention is to permit automatic conversion from sequences of pre-conversion symbols to post-conversion symbols even when predictive mechanisms are used to input either the pre-conversion symbols or post-conversion symbols, or both. This is of particular utility when text is input with reduced keyboards such as a telephone keypad.

A further object of the invention is to provide a method for defining trigger sequences.

A further object of the invention of the invention is to define trigger sequences for Chinese.

A further object of the invention of the invention is to define trigger sequences for Japanese.

A further object of the invention of the invention is to define trigger sequences for Korean.

A further object of the invention is to introduce novel assignments of Hiragana to keys of a keyboard based on the Iroha ordering.

A further object of the invention is to provide a predictive text-entry method for Chinese with automatic conversion based on trigger sequences and tone marks predicted in a variable order such that correction of errors by the user is facilitated.

A further object of the invention is to provide for error-correction mechanisms for text entry with trigger sequences.

A further object of the invention is to provide a mechanism for text entry with conversion such that the conversion mechanism can be implemented with minimal computer memory requirements.

A further object of the invention is to permit highly effective client-server architectures for conversion whereby the memory and processing requirements of the client are vastly reduced.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

The aspects and advantages of the present invention will become readily appreciated in the following detailed description which is best read in reference to the accompanying drawings comprising:

FIG. 6 is a table summarizing aspects of a set of text-entry methods.

FIG. 7 is a table summarizing aspects of a text-entry method which is evident in view of the prior art.

FIG. 9 is a table summarizing aspects of a set of text-entry methods which are evident in view of U.S. Pat. No. 6,219,731, other patents and applications claiming provisional Ser. 60/111,665 as priority, and application WIPO WO 00/35091.

FIG. 10 is a table summarizing aspects of a set of text-entry methods which suffer from drawbacks eliminated by the present invention.

FIG. 11 is a table summarizing aspects of a set of text-entry methods taught by the present invention.

FIG. 12 is a table summarizing aspects of the preferred embodiment of the present invention.

FIG. 15 is a non-limiting example of the entry of a sentence in Chinese using the preferred embodiment.

FIG. 16 is a non-limiting example of text entry with an alternate embodiment as applied to Chinese.

FIG. 17 is a table of Hiragana, with a standard assignment of Hiragana to keys of the telephone keypad.

FIG. 19 is a non-limiting example of entry of Japanese using the preferred embodiment, with the standard assignment of Hiragana to keys of the telephone keypad.

FIG. 20 is a table of Hiragana, with an assignment of Hiragana to keys of the telephone keypad according to an Iroha ordering.

FIG. 23 is a non-limiting example of entry of Japanese using the preferred embodiment, a keypad labeled with an Iroha assignment, and both cHiragana and Hiragana Next keys.

DETAILED DESCRIPTION

The Method of Trigger Sequences. A trigger sequence is a subsequence of keystrokes which minimally has the attribute of triggering conversion substantially if and only if a conversion is intended by the user. It is in addition desirable that: 1) It is intuitive for a native speaker of the language that conversion would take place when the trigger sequence is input.

2) Triggering may be performed even when a predictive mechanism is used to predict the symbol the user intends to enter, for either or both of the pre-conversion or post-conversion symbols.

3) In the case of error-free input of pre-conversion symbols, when a trigger sequence is entered, there are always at least enough not-yet-converted pre-conversion symbols entered to define at least one post-conversion symbol. The conversion which is triggered by entry of the trigger sequence will convert the at least enough not-yet-converted pre-conversion symbols to at least one post-conversion symbol, and may convert more pre-conversion symbols to more post-conversion symbols as well.

4) The trigger sequences be identifiable by a computer with a simple algorithm.

5) Triggering is robust, in that small errors in text entry do not unduly propagate to large errors in the output text.

6) Trigger sequences may be incorporated into predictive mechanisms with minimal memory storage costs.

Figure 1:
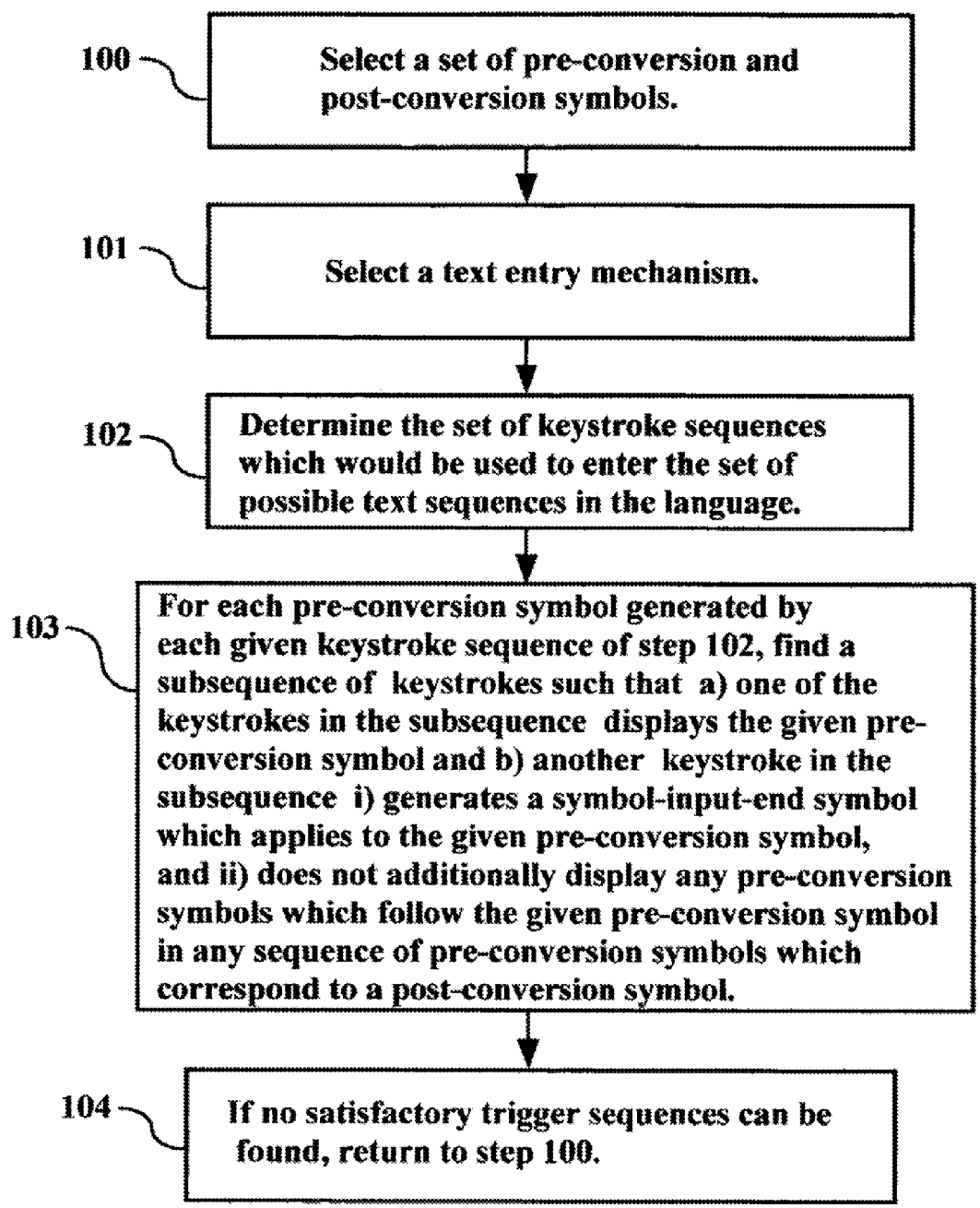
FIG. 1 is a flow chart providing an overview of the method of designing trigger sequences.

According to the teachings of this invention, trigger sequences may be discovered by a systematic method, as is explained in reference to FIG. 1. The method comprises the step 100 of selecting a set of pre-conversion and post-conversion symbols. Typical conventional pre-conversion symbols for Chinese are Pinyin (Latin letters with tone marks), or Bopomofo with tone marks. These symbols are intuitive as pre-conversion symbols for speakers of Chinese since they are conventionally used for that purpose, as is well-known to those skilled in the art. In conventional usage, these symbols do not occur in the final output text, but are only a transitional representation of the text. Typical post-conversion symbols for Chinese are Hanzi.

In the case of Japanese, typical conventional pre-conversion symbols may be either of 1) Latin letters or 2) Hiragana. Using either of these sets of pre-conversion symbols alone, high quality trigger sequences are difficult to form. As will become clear below, if one of the symbol sets, say the Hiragana, is used for non-conversion symbols, and the other (Latin in this example) s used as pre-conversion symbols then robust and useful trigger sequences can be formed simply. The preferred embodiment of the present invention to Japanese benefits from a further inventive step to augment these symbol sets as will be more fully described below. Typical post-conversion symbols for Japanese are Kanji.

In the case of Korean, typical prior-art pre-conversion symbols are Latin letters or Jamo. Typical post-conversion symbols are Hanja. As in the case of Japanese, the Jamo are preferably augmented with a corresponding set of cJamo, as will be described more fully below. In the next step of the method, 101, the characteristics of the text-entry system should be fully defined and specified. The keystroke sequences required to enter text depend on the characteristics of the text-entry system. Characteristics which should be defined include the number of keys, the assignment of symbols to keys, whether the system is predictive or not, the linguistic database in the case of a predictive-text system, the method of advancing symbols in the case of ambiguous assignments of symbols to keys, etc. All of these characteristics influence the set of sequences of keystrokes which correspond to sequences of text in the language. In the next step, 102, the set of keystroke sequences which correspond to the set of possible text to be entered is determined. The set of sequences depends on both the pre- and post-conversion symbol sets selected to represent the language in step 100, and the text-entry method selected in step 101. The set of keystroke sequences could be determined deductively from a formal description of the language, the set of symbols used to represent the language, and the text-entry method, or it could be induced from a large corpus of text in the language. In the case of a deductive approach, an explicit model of input of the language is developed, and the required trigger sequences are deduced from the model. In the case of an inductive approach, a body of text is collected and the corresponding keystroke sequences analyzed. The goal is to construct an input-output map so that when the keystroke sequences are input, the text is recovered as output. Methods for doing this are well known in the art, and include but are not limited to statistical techniques such as genetic algorithms, genetic programming, simulated annealing, and artificial neural networks. As will be appreciated by one skilled in the art, the statistical techniques are applied by defining a rating function which takes the set of training data, the set of keystroke sequences derived from the language and a candidate set of trigger sequences, and scores the set of trigger sequences according to how well they produce conversions which correspond to the conversions the user would intend. The best candidate solutions are then modified to form new candidate solutions which are then scored in the same manner, in an iterative fashion. Typically, with continued iteration of the process, trigger sequences of increasingly high quality will be found. Once these keystroke sequences have been effectively determined and described, then at step 103, one should, for each pre-conversion symbol generated by the keystroke sequences of step 102, find a subsequence of keystrokes such that one of the keystrokes displays the pre-conversion symbol and another keystroke generates a symbol-input-end symbol but not a pre-conversion symbol intended to be converted to the same post-conversion symbol as the first one.

It may be that no satisfactory set of sequences can be found which fulfill both criteria sufficiently well, in which case the method returns, in step 104, to step 100 to redefine the symbol sets and text-entry method characteristics, as required. If a set of sequences can be found which meet the criteria set forth in step 103, then this set of keystroke sequences are adopted as trigger sequences for the language.

Figure 2:
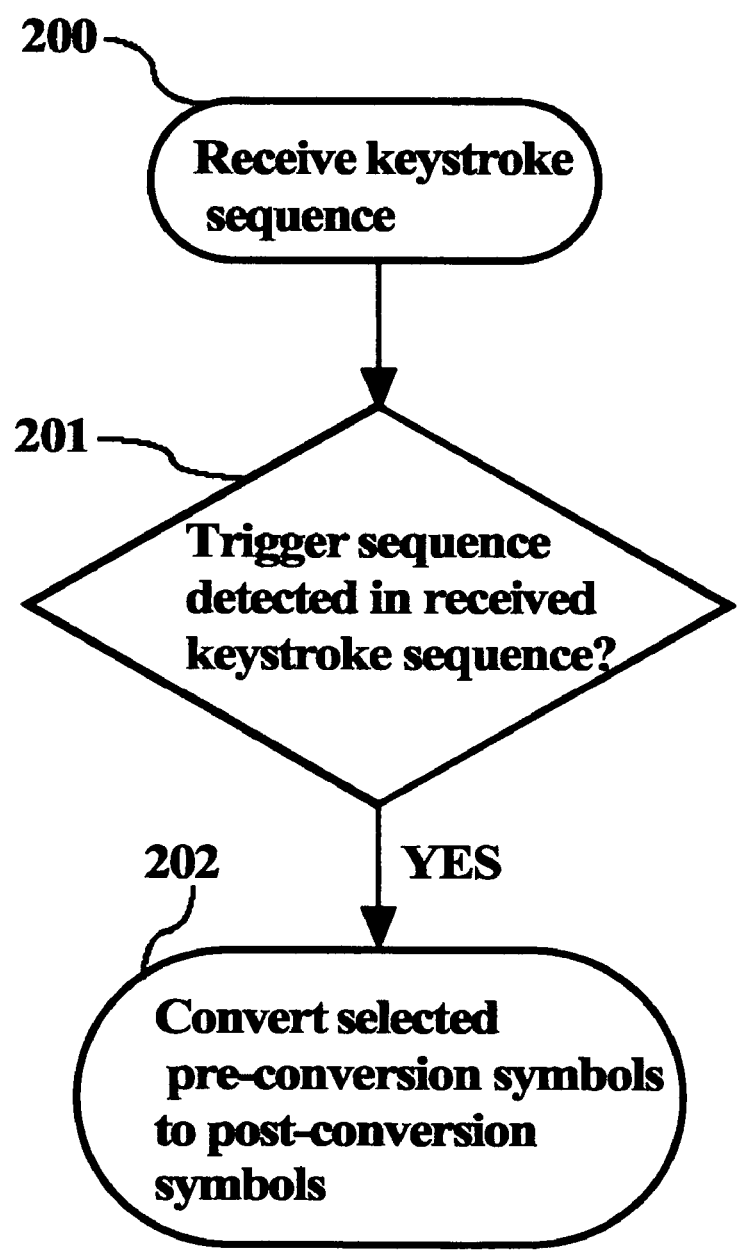
FIG. 2 is a flow chart providing an overview of a text-entry system based on trigger sequences.

Basic Operations Turning now to FIG. 2, we study the basic operations of a text-entry system based on trigger sequences according to this invention. A natural language text-entry system based on trigger sequences comprises 1) a plurality of keys, 2) a plurality of pre-conversion symbols, 3) a plurality of post-conversion symbols, 4) a plurality of symbol-input-end symbols, 5) a display to display symbols, 6) a first mechanism to display said pre-conversion symbols in response to keystrokes, and 7) a second mechanism to recognize trigger sequences and thereby triggering conversion of a plurality of pre-conversion symbols displayed by the first mechanism to a plurality of the post-conversion symbols, the trigger sequences comprising a subsequence of keystrokes, the subsequence comprising at least two of keystrokes such that the first of keystrokes in the subsequence causes the first mechanism to display at least one pre-conversion symbol, and the second keystroke in the subsequence generates at least one symbol-input-end symbol, where the generated symbol-input-end symbol applies to at least one pre-conversion symbol displayed by the first mechanism in response to the first keystroke of the trigger sequence whereby conversion of a plurality of pre-conversion symbols to a plurality of post-conversion symbols is effected without the need for a keystroke on a dedicated convert key.

According, the text entry method based on trigger sequences receives 200 a keystroke sequence entered by the user and received by the mechanism. The mechanism 201 to recognize trigger sequences in the input keystroke sequence examines the input keystroke sequence to determine if a trigger sequence has been received. If so, then the conversion mechanism 202 is triggered. The conversion mechanism converts selected pre-conversion symbols into post-conversion symbols inasmuch as is possible or desired according to other aspects of the invention. If any conversion is possible, the conversion includes processing of at least any pre-conversion symbols displayed as result of an element of the trigger sequence.

Figure 3:
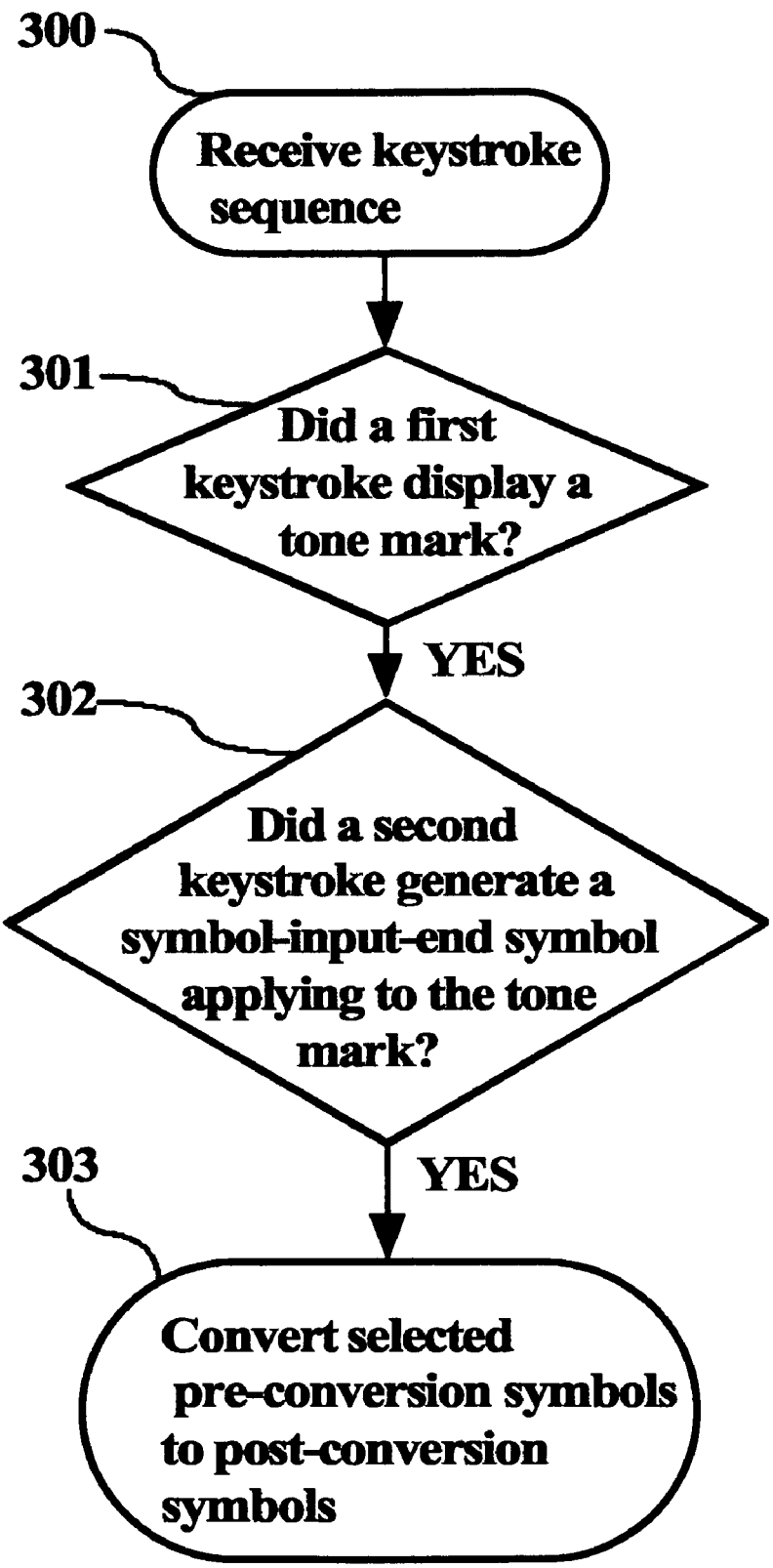
FIG. 3 is a flow chart providing an overview of a text-entry system based on trigger sequences for Chinese.

As will be developed in more detail below, relative to a simple but effective model of Chinese, a very simple set of trigger sequences may be defined. In this case, the trigger sequences are comprised of the last keystroke causing a tone mark to be displayed, followed by a keystroke generating a symbol-input-end symbol (possibly among other symbols generated by the same keystroke). An overview of the basic operations of this text-entry system for Chinese are described in reference to FIG. 3. At step 300, a sequence of keystrokes entered by the user are received by the text-entry system. This sequence is examined for the presence of trigger sequences in steps 301 and 302. The trigger sequence in this case comprises a) a keystroke which serves to display a tone mark (checked by the mechanism at step 301), followed by a keystroke which generates a symbol-input-end symbol applies to the tone mark (checked by the mechanism at step 302). If the mechanism verifies that each of these conditions holds, then it will trigger the conversion mechanism, which at step 303 will attempt to convert pre-conversion symbols to post-conversion symbols.

As will be developed in more detail below, relative to a simple but effective model of Japanese, a simple set of trigger sequences may be defined. In this case, there are two different classes of trigger sequences. The first class contains trigger sequences which are at least two keystrokes in length and are comprised of a keystroke causing a cHiragana to be displayed followed by a keystroke on a key which generates a symbol-input-end symbol but which cannot generate a cHiragana symbol. Note that the trigger sequence for Japanese allows strings of cHiragana to be input without necessarily causing conversion. Strings of cHiragana may be input without conversion, since a keystroke on a key to which a cHiragana is associated will not trigger a conversion by trigger sequences of the first class. Compare this to the case of Chinese. In Chinese, strings of tone marks are not encountered in sequences generated according to the model of Chinese, so no such restriction is required. By contrast, for Japanese, conversion is often desired once a contiguous sequence of cHiragana has been input, and the sequence of cHiragana is terminated by input of a non-cHiragana. The second class of trigger sequences for Japanese handles this case. The second class contains trigger sequences which are at least two keystrokes in length and comprised of a keystroke causing a cHiragana symbol to be input followed by a keystroke or keystrokes causing a non-conversion symbol to be input. In summary, the first class of trigger sequences will cause conversion in cases such as input of a punctuation symbol, an end-message symbol, or some other symbol which indicates that the input of a contiguous sequence of cHiragana is definitively terminated. The second class of sequences allows for input of contiguous sequences of cHiragana interspersed with input of sequences of other symbols such as Hiragana symbols. In practice, for typical Japanese sentences, the second class of trigger sequences will be invoked more often than the first class.

Note that in some implementations a single keystroke could, a) terminate the input the previously displayed cHiragana, b) display a non-conversion symbol, and c) terminate the input of the non-conversion symbol. In such an implementation, the second and third keystrokes of the trigger sequences in the second class could correspond to the same physical act of stroking a key. In typical implementations especially those involving predictive software, the second and third keystrokes in the definition of the second class of trigger sequences will indeed correspond to two distinct physical keystrokes. Note also that a more elaborate system might allow for input of many different symbol types, such as all of cHiragana, Hiragana, cLatin, Latin, Katakana, punctuation symbols, etc. In these cases, more classes of trigger sequences might have to be defined. Extension of the teachings of this invention to such cases will be well within the grasp of a person skilled in the art who has read and understood the present disclosure. Similarly, it should be clear that a text-entry system for Chinese could involve several Latin-based symbol sets, with, for example, one set for the entry of languages based on Latin letters, and another Latin-based set of symbols for conversion to Hanzi.

Figure 4:
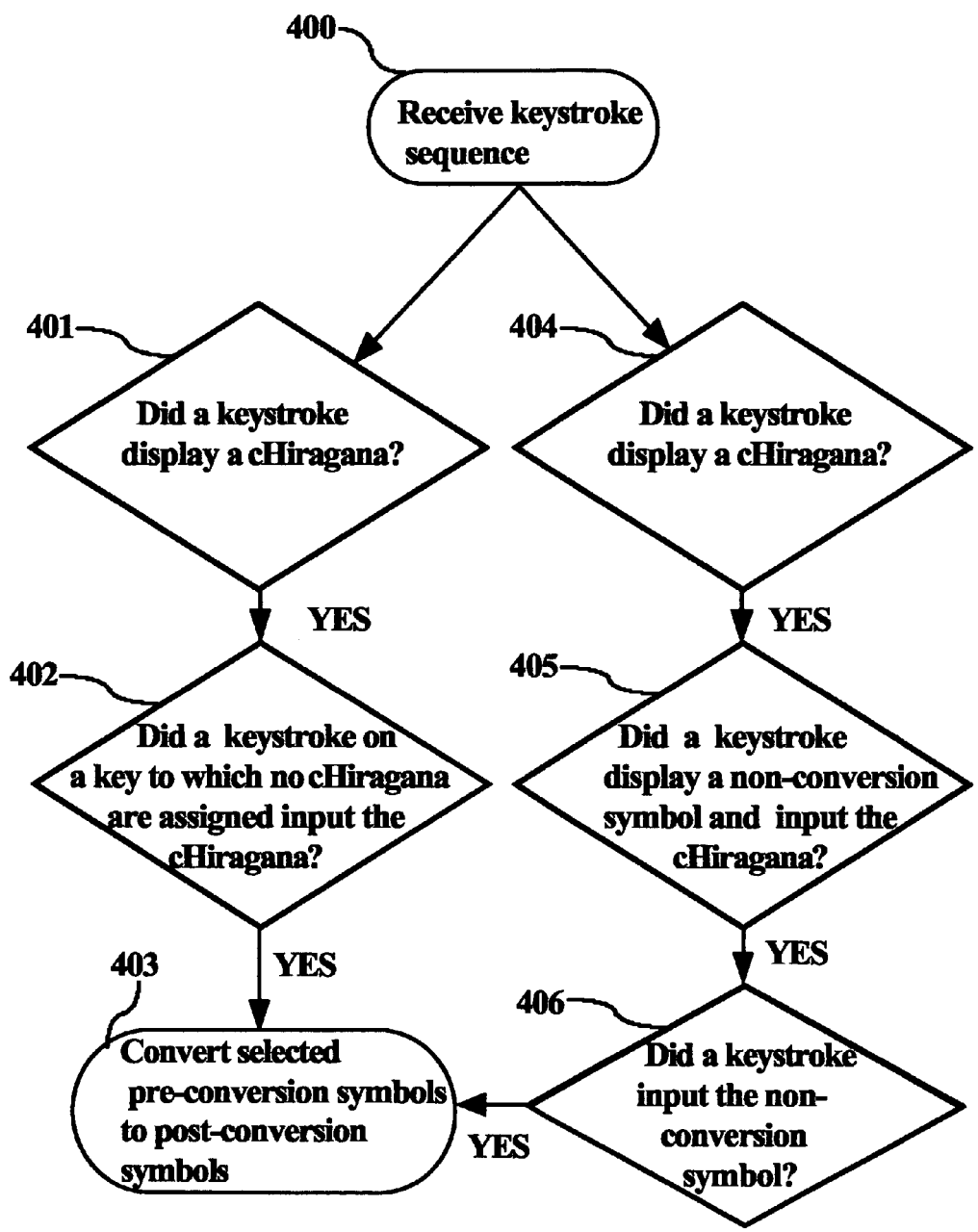
FIG. 4 is a flow chart providing an overview of a text-entry system based on trigger sequences for Japanese.

Referring to FIG. 4, we provide an overview of the operation of this system. At step 400, a keystroke sequence is received for examination for the presence of trigger sequences. The mechanism to recognize trigger sequences looks for sequences from one of two classes. For the first class, at step 401, the input sequence is examined for a keystroke which caused a cHiragana to be displayed. The sequence is then further examined 402 for a subsequent keystroke on a key to which no cHiragana are assigned which generated a symbol-input-end symbol which applies to the cHiragana displayed in step 401. If such a pair of keystrokes is found in the sequence, then the conversion mechanism is triggered 403. If a trigger sequence of the first class is not found, the input sequence may be also examined for a trigger sequence of the second class. The examination will search for 404 a keystroke causing a cHiragana to be input, a keystroke causing a non-cHiragana to be displayed 405, a keystroke generating a symbol-input-end symbol terminating the input of the non-cHiragana 406. If such a subsequence of three keystrokes is found, then the conversion mechanism is triggered 403.

As will be developed in more detail below, relative to a simple but effective model of Korean, a simple set of trigger sequences may be defined. The model of Korean could a priori be based either on the model of Chinese or the model of Japanese, as presented above. Modeling Korean text entry on Japanese is preferred since a) in Korean entry of ideographic Hanja is often done without the use of tone marks, and b) the usual symbols used in Korean for representing sounds of Hanja, that is, the Jamo, are also used for entering Hangul, in the same way that Hiragana in Japanese have the dual role of being used both for entering Kanji, and to be represented qua Hiragana in the output text. To distinguish the dual roles of the Korean Jamo, we define a set of related cJamo, analogously with the construction of the set of cHiragana for Japanese. The cJamo are entered with the intent of being converted to Hanja, while the Jamo are entered with the intent of forming Hangul. The person skilled in the art will appreciate that the pair Latin/cLatin could also be used for Korean in the same way that the pair Latin/cLatin can be used for Japanese. Indeed any dual representation of the phonetic structure of Korean would be a basis for Korean text entry according to the teachings of this invention.

Thus in the Korean case, as in the Japanese case, there are two different classes of trigger sequences. The first class contains trigger sequences which are at least two keystrokes in length and are comprised of a keystroke causing a cJamo to be displayed followed by a keystroke on a key which generates a symbol-input-end symbol but which cannot generated a cJamo symbol.

Figure 5:
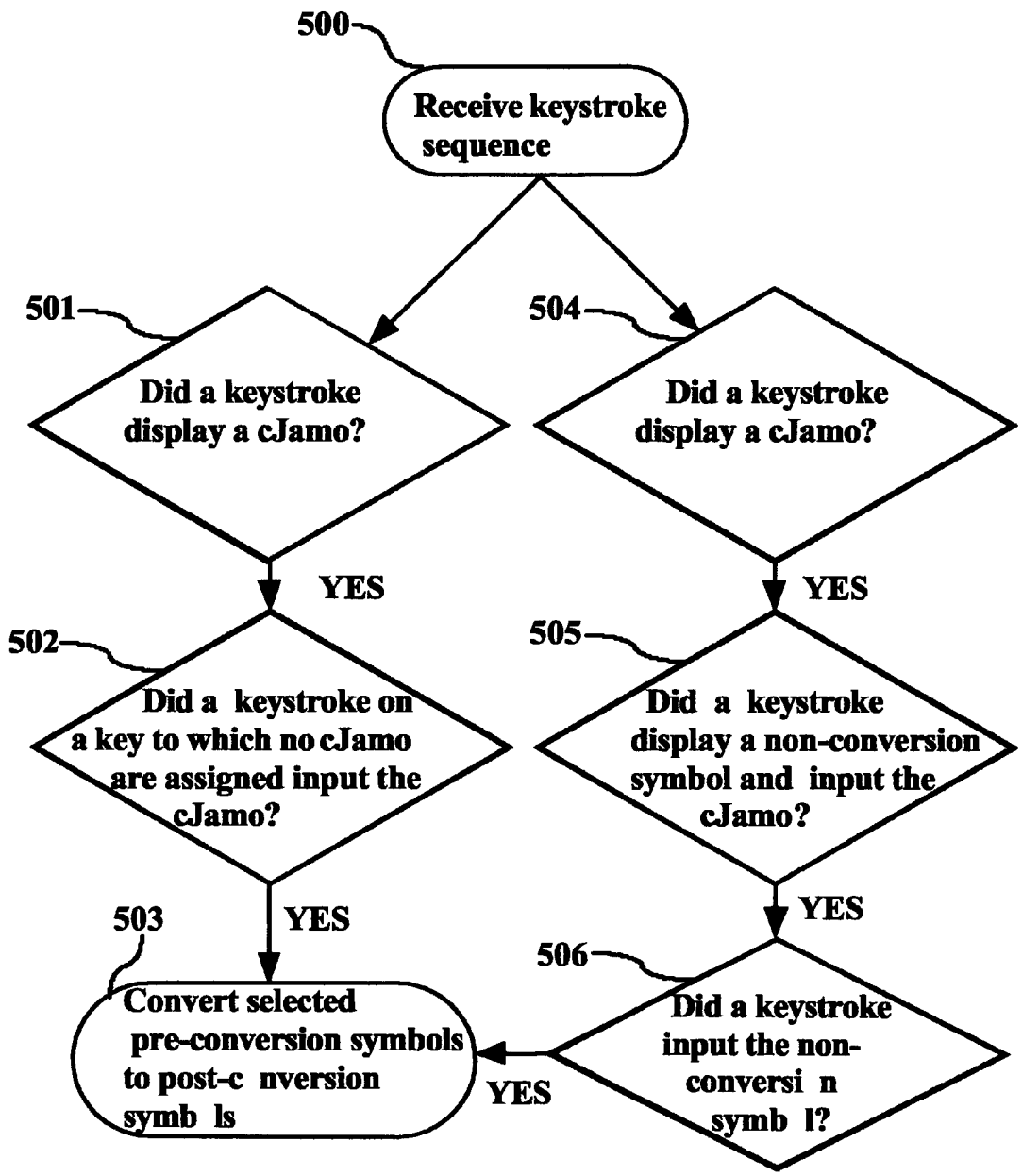
FIG. 5 is a flow chart providing an overview of a text-entry system based on trigger sequences for Korean.

The second class contains trigger sequences which are at least three keystrokes in length and comprised of a keystroke causing a cJamo symbol to be input, followed by a keystroke causing a non-conversion symbol to be additionally displayed, further followed by a keystroke generating a symbol-input-end symbol. Referring to FIG. 5, we provide an overview of the operation of this system. At step 500, a keystroke sequence is received for examination for the presence of trigger sequences. The mechanism to recognize trigger sequences looks for sequences from one of two classes. For the first class, at step 501, the input sequence is examined for a keystroke which caused a cJamo to be displayed. The sequence is then further examined 502 for a subsequent keystroke on a key to which no cJamo are assigned which generated a symbol-in-put-end symbol. If such a pair of keystrokes is found in the given order in the sequence, then the conversion mechanism is triggered 503. If a trigger sequence of the first class is not found, the input sequence may be also examined for a trigger sequence of the second class. The examination will search for 504 a keystroke causing a cJamo to be input, followed by 505 a keystroke causing a non-cJamo to be displayed, followed by 506 a keystroke generating a symbol-input-end symbol. If such a sequence of three keystrokes is found, then the conversion mechanism is triggered 503.

It will be appreciated that the mechanisms described flow charts of FIG. 1-5 can be implemented in hardware, software, firmware, or a combination thereof. In the preferred embodiments, the invention is implemented in software or firmware that is stored in a memory and that is executed by a suitable instruction execution system. If implemented in hardware, the invention can be implemented with any technology which is all well-known in the art. It will be further appreciated that in general a flow chart describing the invention shows the architecture, functionality, and operation of a possible implementation of the invention. In this regard, each block represents a module, segment, or portion of code, which comprises one or more executable instructions for implementing the specified logical functions. It should also be noted that in some alternative implementations the functions noted in the blocks may occur in other orders, substantially concurrently, or in parallel.

It will also be appreciated that for the sake of clarity of presentation, flow-chart logical nodes representing null operations have been omitted.

Text-entry system classification. Turning now to FIG. 6, we describe the class of text-entry systems which contains the present invention. The intent of this and subsequent figures is to precisely locate the boundary between the present invention and prior-art systems. There are a priori 64 different text-entry systems defined by the table of FIG. 6, when all possible combinations of options are considered. Description of all of these options will allow us to particularly point out the novel features of the present invention, as we will be able to divide the full set of text-entry systems in the table into several subsets:

1) Systems evident to one skilled in the art,
2) Systems evident to one skilled in the art in view of GUTOWITZ (U.S. Pat. No. 6,219,731) or the Avios Article.
3) Novel systems with drawbacks.
4) Novel systems in which the drawbacks have been substantially eliminated.

The first column of the table describes an aspect of the design of a text-entry system, and the second and third columns give two major options for embodying the design aspect. In view of the definitions given above, and the non-limiting examples given below, the entries of the table are readily interpretable by one skilled in the art.

The design aspect considered are: 1) Pre-conversion: whether the pre-conversion symbols are presented in a variable or fixed order. 2) Pre-conversion advance: whether the presentation of multiple pre-conversion symbols on the same key are scrolled using a dedicated Next key or using multi-tap. 3) Tone mark: whether the tone mark is included in the variable ordering of other pre-conversion symbols, or always appears in a fixed order in relationship to the other pre-conversion symbols. That is, and this will be more fully described below, the tone mark assigned to a key may always be displayed after all of the pre-conversion symbols have been displayed in the scroll order, even if the other pre-conversion symbols are presented in a variable order. 4) Conversion: whether conversion occurs when a trigger sequence is entered, or when a tone mark is input (for systems which use tone marks as a pre-conversion symbol). Note that most prior-art systems perform conversion only upon a keystroke on a dedicated conversion key. 5) Post-conversion symbols. whether post-conversion symbols are presented in a variable or fixed order, independently of whether pre-conversion symbols are presented in a variable or fixed order. 6) Post-conversion advance. Whether post-conversion symbols are scrolled using a Next key or multi-tap, independently of the advance method used for the pre-conversion symbols. Note that in the case of both pre- and post-conversion symbols, the Next key could be implemented in a variety of hardware, such as a scroll wheel, a touch pad, etc. Similarly, a multi-tap method could be implemented as multiple actuations of various kinds of input mechanisms. 7) Predictive method: symbol-based or word-based. There are two broad classes of predictive text entry systems. In each case, a selection as to which symbol or symbols to display is based on context. A word-based system typically depends on a dictionary of known words to decide which word or symbol to display, while a symbol-based system does not. While most non-limiting examples presented in this disclosure assume a symbol-based approach, this is for clarity and conciseness of presentation, and should not be seen as a limitation of the invention to symbol-based systems. Trigger sequences work well for both symbol-based, word-based, as well as any hybrid systems.

In reference now to FIG. 7, we observe that the closest prior art to this invention is the combination of aspects of a text-entry system for Chinese as follows: 1) Pre-conversion: fixed order, 2) Pre-conversion advance: multi-tap, 3) Tone mark: fixed order 4) Conversion: on tone mark entry, 5) Post-conversion: fixed order, 6) Post-conversion advance: multi-tap. 7) Predictive method: symbol based or word based. This set of aspect options describes in particular a full-sized keyboard in which each of the letters and each of the tone marks may be unambiguously entered with a single keystroke as each is assigned to a different key, or a single keystroke in combination with an auxiliary key such as a shift key. Since the keyboard is unambiguous, the advance method is trivial; it is multi-tap entry in which multiple taps are never required. When a tone mark is (unambiguously) entered, conversion occurs, and the post-conversion symbols are presented in a fixed order.

Non-inventive application of the prior art to the telephone keypad.

Figure 8:
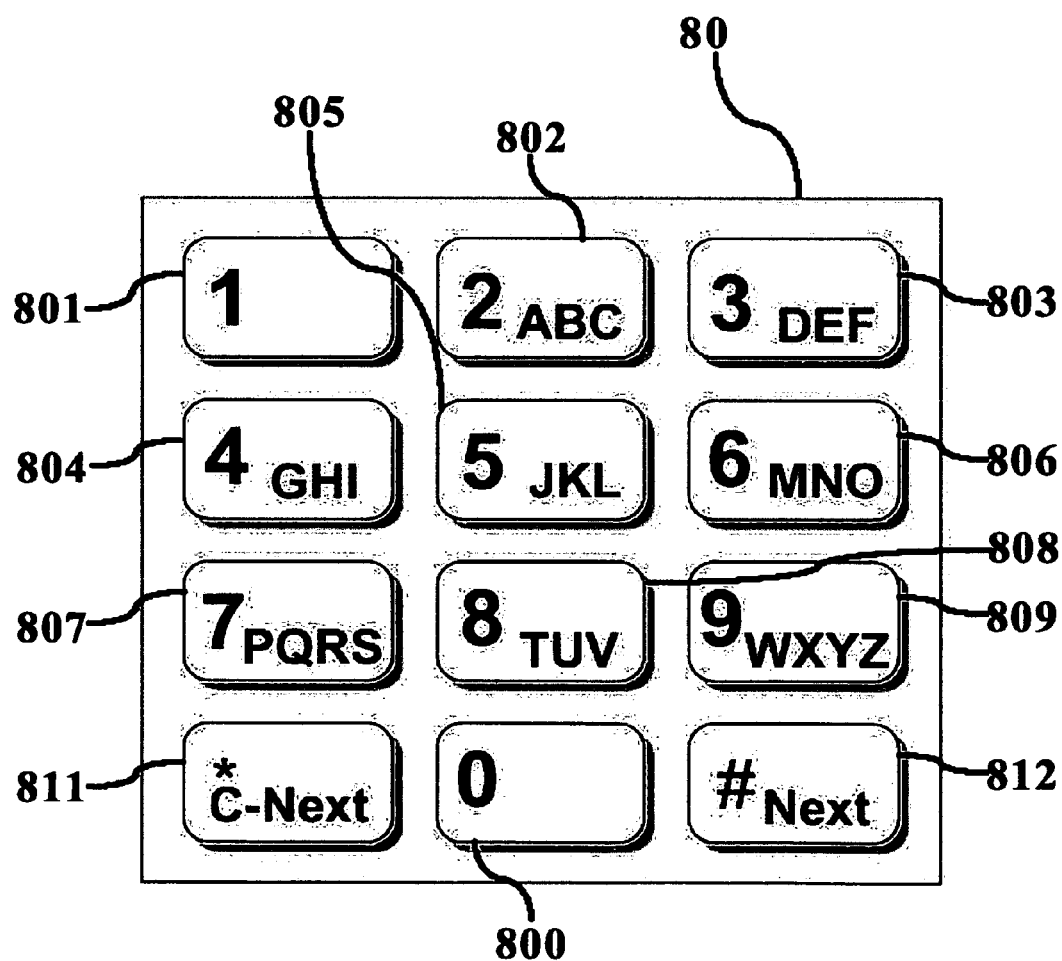
FIG. 8 is a telephone keypad with Next keys for both pre-conversion and post-conversion symbols.

Turning now to FIG. 8, we describe a telephone keypad 80 suitable for entering Latin letters and tone marks as pre-conversion symbols for Chinese. Each of the keys 801-805 may be used to enter the tone marks 1-5, and the keys 802-809 may be used to enter Latin letters as shown.

A person skilled in the art wishing to apply the prior art for Chinese text entry to a telephone keypad would proceed to implement the set of aspects of the prior art text-entry systems as shown in FIG. 7 to the keypad as shown in FIG. 8.

This system is operative to enter text, provided that the tone mark is placed at the end of the fixed order, after the letters. In this system, conversion occurs as soon as the tone mark is displayed, and yet a letter after the tone mark may have be been intended. The intended letter could not be entered since conversion would already have occurred. This restriction means that the number of keystrokes to enter a tone mark will always be high. Except for the tone mark 1 assigned to the key 801, at least four keystrokes would be required to enter each tone mark. In view of the teachings of Gutowitz (U.S. provisional Ser. 60/111,665, PCT/US99/29,343, WIPO WO 00/35091, and related patent documents), this difficulty could be overcome by the addition of a shift key such that e.g. the tone mark is entered by applying the shift key substantially simultaneously with the keystroke on the appropriate letter/tone mark key.

An additional drawback of this system is that error correction is difficult. In the event that a user who intends to enter a letter presses the letter key too many times, causing a tone mark to be entered and conversion to occur, the user must delete the displayed post-conversion symbol and start over again.

In view of the teachings of GUTOWITZ (U.S. Pat. No. 6,219,731) it would be evident to one skilled in the art to replace multi-tap advance with Next-key advance for either or both of pre-conversion or post-conversion symbols. This however, would not eliminate the stated drawbacks of this system.

Further in view of the teachings of GUTOWITZ '731 it would be obvious to one skilled in the art to use a predictive system to produce a variable order for either or both of the pre-conversion or post-conversion symbols. Non-obviously, as long as the tone mark were not predicted, and remained at the end of the order of the pre-conversion symbols, the complete system would be operative to enter text. The drawbacks cited would still remain, however.

In summary thus far, and in reference to FIG. 9, the following class of operative systems are obvious in view of the prior art: Pre-conversion: variable or fixed order (but tone mark fixed at the end of the order, regardless). Pre-conversion advance: multi-tap or Next key. Tone mark: fixed order. Conversion: on tone mark. Post-conversion: variable or fixed order. Post-conversion advance: multi-tap or Next key, Predictive method: symbol based or word based.

In summary and in reference to FIG. 10, the following class of systems are so difficult to use as to be substantially inoperative: Pre-conversion: variable or fixed order. Pre-conversion advance: multi-tap or Next key. Tone mark: variable order. Conversion: on tone mark entry. Post-conversion: variable or fixed order. Post-conversion advance: multi-tap or Next key, Predictive method: symbol based or word based.

In summary and in reference to FIG. 11, this invention teaches the construction of the following class of systems, all of which eliminate the drawbacks of the prior art systems or those systems obvious to one skilled in the art given the prior art systems: Pre-conversion variable or fixed order. Pre-conversion advance: multi-tap or Next key. Tone mark: variable or fixed order. Conversion: on trigger sequence entry. Post-conversion: variable or fixed order. Post-conversion advance: multi-tap or Next key, Predictive method: symbol based or word based.

In reference to FIG. 12, the most-preferred embodiment is the class of systems described by: Pre-conversion: variable order. Pre-conversion advance: Next key. Tone mark: variable order. Conversion: on trigger sequence entry. Post-conversion: variable order. Post-conversion advance: Next key, Predictive method: symbol based or word based.

Preferred embodiment for Chinese. We now present further details on the application of the invention to text entry for Chinese. To apply the trigger sequence method to Chinese, we follow the steps shown in FIG. 1. It will be appreciated by one skilled in the art that while in this non-limiting example the tone mark is shown as represented by a digit in the displayed output, the tone mark could also be denoted by a diacritical mark on the Pinyin syllable to which it applies, or by some other display feature.

According to the teachings of this invention, trigger sequences may be discovered by a systematic method, as is explained in reference to FIG. 1. The method comprises the step 100 of selecting a set of pre-conversion and post-conversion symbols. As mentioned above, typical pre-conversion symbols for Chinese are Pinyin (Latin letters with tone marks), or Bopomofo with tone marks. There is a simple mapping between Pinyin and Bopomofo, so it will be appreciated by one skilled in the art that substantially the same construction as described here in reference to Pinyin would work as well for Bopomofo, or any other class of symbols sufficient to substantially represent the sounds of Chinese. Pinyin symbols are intuitive as pre-conversion symbols for speakers of Chinese since they are conventionally used for that purpose, as is well-known to those skilled in the art. Thus we choose Pinyin at this step as pre-conversion symbols, the Pinyin comprising Latin letters and a tone mark attached to each Pinyin syllable. To complete step 100, we choose the post-conversion symbols to be Hanzi.

In the next step of the method, 101, the characteristics of the text-entry system are fully defined. These characteristics of the preferred embodiment have already been summarized in FIG. 12. We will use a predictive method on both pre- and post-conversion symbols, Next key advance for both pre- and post-conversion symbols, and perform conversion upon entry of a trigger sequence. The number of keys will be set at 12, and the assignment of pre-conversion symbols to keys will be as shown in FIG. 8. The Next key for pre-conversion will be the key 812 and the Next key for post-conversion will be the key 811. All of the keys of keypad 80 except the Next key 812 generate, in addition to any pre- or post-conversion symbols they might cause to be displayed, a symbol-input-end symbol which applies to the last pre-conversion symbol which was displayed. Thus, in particular if the Next key for conversion (C-Next) 811 is pressed, it terminates the input of the last pre-conversion symbol displayed. This completes step 101. To execute step 102, we need to describe the set of keystroke sequences which will be generated when the text-entry system is used.

To make the following description concrete but without the intent of limitation, we will consider that the tone marks are represented by the digits 1 through 5, and are entered at the end of each Pinyin syllable. This usage follows conventional practice. Note that in an alternate convention, tone marks are displayed as diacritics on the Latin letters to which they apply, not as numbers. It will be appreciated that this display convention does not alter the construction of the text-entry system, and the tone mark could be entered in any way. To simplify the specification of keystroke sequences, we will assume that a) only sequences of valid Pinyin are entered by the user, each followed by a tone mark, b) to each valid Pinyin syllable entered, there corresponds at least one Hanzi in the set of post-conversion symbols. In practical applications, mechanisms would be set up to deal with variant keystroke sequences, such as those containing pre-conversion sequences which are not valid Pinyin sequences. This may imply more complicated trigger sequences than are needed for this ideal text-entry system, described for the sake of pointing out features and applications of the invention.

At step 103, one should, for each pre-conversion symbol generated by the keystroke sequences of step 102, find a subsequence of keystrokes such that a) one of the keystrokes in the subsequence displays the given pre-conversion symbol and b) another keystroke in the subsequence i) generates a symbol-input-end symbol which applies to the given pre-conversion symbol, and ii) does not additionally display any pre-conversion symbols which follow the given pre-conversion symbol in any sequence of pre-conversion symbols which correspond to a post-conversion symbol.

In the present non-limiting example of Chinese, a set of keystrokes which meet these criteria are comprised of the last keystroke causing a tone mark to be displayed, followed by a keystroke on any other key but the Next key 812, as only 812 does not generate a symbol-input-end symbol which applies to a pre-conversion symbol. Where no such trigger sequences to be found, the method would return, in step 104, to step 100.

Figure 13:
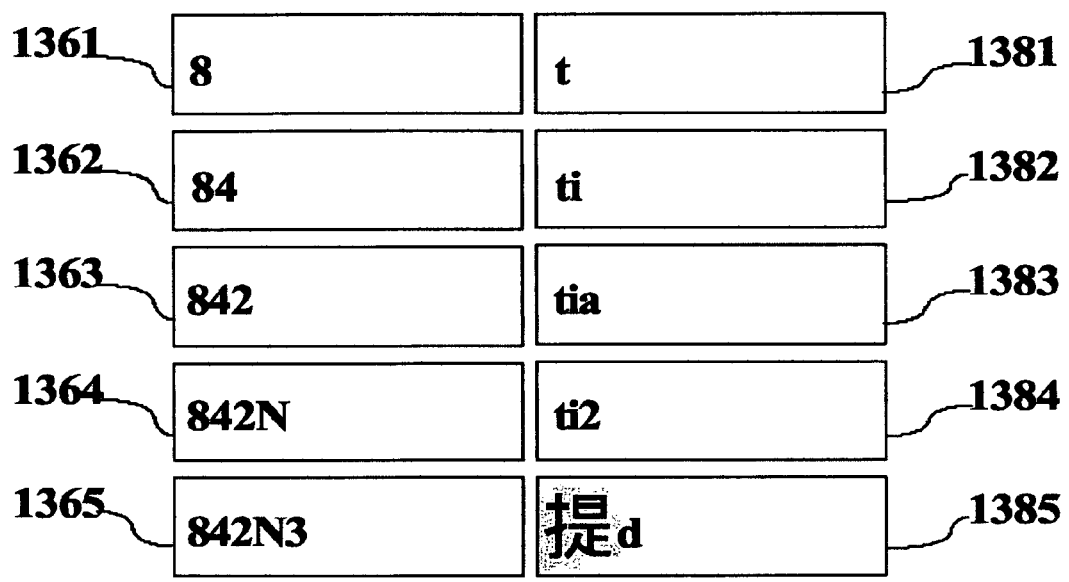
FIG. 13 is a non-limiting example of text entry with the preferred embodiment as applied to Chinese.

The operation of this system may be more fully appreciated though the consideration of some non-limiting examples. Turning now to FIG. 13, we describe the entry of a Pinyin syllable and conversion of that syllable to a Hanzi by means of a trigger sequence, using the preferred embodiment. At step 1361, the key 808 is pressed, causing the symbol t to be shown in the display 1381. This letter is chosen as the most likely letter intended by the user in this context, from the letters t, u, and v assigned to the key 808. As t was indeed the letter intended by the user, at 1362 the user presses the key 804 causing letter i to be appended in the display 1382. At step 1363, the user intends to enter the tone mark 2, and so presses the key 802 to which the symbols a,b,c, and tone mark 2 are assigned. The predictive system displays the letter a, as it considers that this letter is the most likely correct response to the keystroke. The user proceeds, at step 1364, to press the (pre-conversion) Next key 812 to display the tone mark 2. Note carefully that this keystroke does not complete a trigger sequence. It serves to display a tone mark, but the Next key 812 does not generate a symbol-input-end symbol. Thus, the tone mark is displayed, but not input at this point. At step 1365, the user presses the key 803 to enter the first letter of the next Pinyin syllable. This keystroke displays the letter d, which the predictive system for pre-conversion symbols proposes as the most likely choice among the symbols d,e,f, and tone mark 3 assigned to the key 803. In addition, the keystroke at step 1365 also generates a symbol-input-end symbol, which applies to the tone mark displayed at step 1364. This keystroke, therefore, completes a trigger sequence. The trigger sequence triggers a conversion. The predictive system for post-conversion symbols chooses the Hanzi shown in display 1385 as the most likely to be intended by the Pinyin ti2 which is shown in the display 1384. The Pinyin syllable is replaced with the selected Hanzi in display 1385. The user may then either 1) continue to input the next Pinyin syllable, if the predictive system on post-conversion symbols selected the intended Hanzi, or 2) press the C-Next key 811 to change the displayed Hanzi. Notice that the use of C-Next 811 is typically not required and hence, due to the recognition and processing of the trigger sequence, the explicit conversion step has been eliminated, to the benefit of the user.

Figure 14:
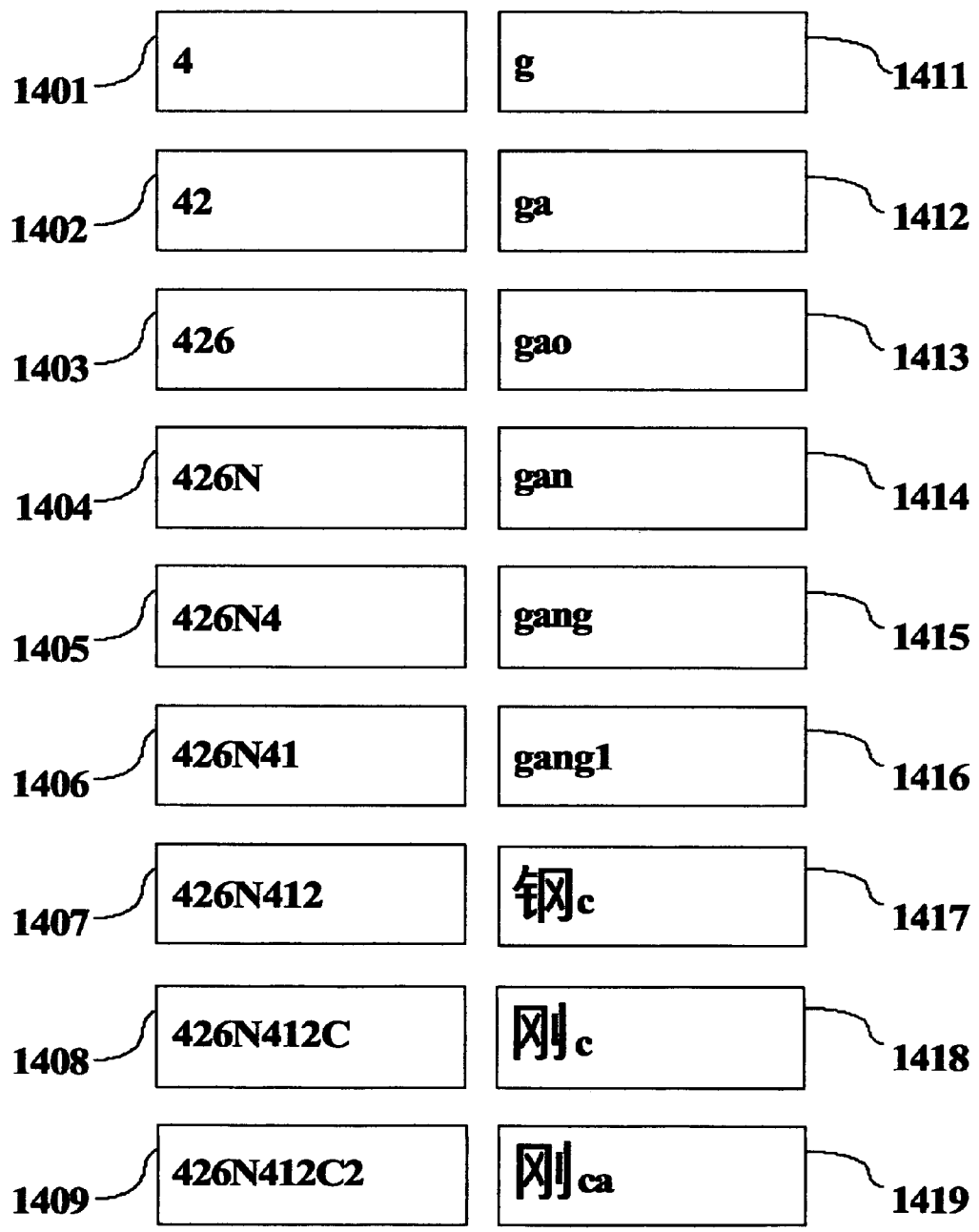
FIG. 14 is a second non-limiting example of text entry with the preferred embodiment as applied to Chinese.

A second non-limiting example will help reinforce understanding of how trigger sequences can be used to seamlessly integrate predictive mechanisms on both pre-conversion and post-conversion symbols. This non-limiting example includes the operation of predictive mechanisms on both sets of symbols, and uses both pre-conversion and post-conversion Next keys to allow the user to correct errors in prediction, if any. For this second non-limiting example, we refer to FIG. 14. In steps 1401-1406, the Pinyin syllable gang1 is input using a letter-by-letter predictive system, where the user presses the Next key (N) as required, that is, at step 1404. A person skilled in the art will appreciate that the same syllable might also have been produced by a word-based predictive system, a letter- or word-based predictive system, etc., without modification to the fundamental features of the invention. An important observation is that though gang1 is displayed in the display 1416, the syllable has not yet been fully input and a trigger sequence has not yet been completed. Step 1407 completes the trigger sequence, causing conversion of gang1 to the first Hanzi predicted by the predictive system on post-conversion symbols, and display of the letter c by the predictive system for pre-conversion symbols. In this case, the predicted Hanzi is not the Hanzi intended by the user. The user thus presses C-Next (C), at step 1408 to advance to the next Hanzi. Note carefully that 1) the keystroke at step 1407 issued a symbol-input-end symbol which refers to the last pre-conversion symbol entered (the tone mark 1) but does not end the input of the post-conversion Hanzi shown in the display 1417. 2) C-Next issues a symbol-in-put-end symbol which applies to the last pre-conversion symbol displayed but not to the last post-conversion symbol displayed. Thus, The keystroke on C-Next at step 1408 causes a new Hanzi to be displayed, but that Hanzi would not be definitely input until a further Hanzi is displayed. That is, symbol-input-end symbols apply to the last pre- or post-conversion symbol displayed but not in-put, as appropriate.

To put these two non-limiting examples in context and thus perfect understanding, we turn now to FIG. 15 which shows the sequences of keystrokes (1500, continuing to 1530), Pinyin pre-conversion symbols (1510, continued to 1540), and Hanzi post-conversion symbols (1520, continuing to 1550) for an entire sentence in Chinese. As an aid to understanding, the keystroke sequence and the Pinyin sequences are presented broken into groups separated by spaces according to the Hanzi to which they correspond. The Pinyin groups are shown as displayed just before conversion to Hanzi.

An alternate embodiment for Chinese will now be described to show how the present invention can be implemented if multi-tap rather than Next key advance is used for pre-conversion symbols, a Next key is used for post-conversion symbol advance, and a fixed order is used for both pre-conversion and post-conversion symbols. With both this alternate embodiment and the preferred embodiment in mind, a person skilled in the art would be able to make and use systems with any of the aspects implemented according to any of the options of FIG. 11, by making appropriate combination of the teachings. If a multi-tap advance is used for pre-conversion symbols, then the assignment of (pre-conversion) symbol-in-put-end symbols to keys is different from the assignment if Next key advance is used. As described above, in a multi-tap system, multiple keystrokes on the same key may correspond to one, or more, pre-conversion symbols. If multiple pre-conversion symbols are intended to be in-put, then some mechanism should be available to issue symbol-input-end symbols to partition the multiple keystrokes on the same key into distinct symbols. In typical implementations there is either a) a time-out whereby if the user waits long enough after a keystroke in the multi-press sequence, then the system generates a symbol-input-end symbol or b) a time-out-kill key which ends the time-out, issuing a symbol-input-end symbol. In a multi-tap system, a sequence of multiple keystrokes on the same key is ended when the user performs a keystroke on any other key. In this case, the other key issues a (pre-conversion) symbol-input-end symbol, in addition to other functions it might potentially have.

To see a non-limiting example of this alternate embodiment in operation, we turn to FIG. 16. This figure shows the keystroke sequence required to input one of the Hanzi corresponding to the Pinyin di4, using the keypad of FIG. 8. The letters are presented in a fixed alphabetic order, as given in FIG. 8, with the tone mark, if any, last in the order. Thus, the keystroke on key 803 at step 1621 serves to display the letter d in the display 1641, and the three successive keystrokes on key 804 at steps 1622-1624 serve to display the letter i, after the intermediate letters g and h. Since the intended tone mark, 4, is assigned to the same key 804 as the displayed letter i, a pre-conversion symbol-input-end symbol should be issued to definitely in-put the letter i. This is accomplished by the user at step 1625 by pressing the time-out-kill key (T). The display does not change; 1644 is the same as 1645, but at step 1625 the letter i is definitely input, while at 1624 it is only displayed. The four keystrokes on key 804 at steps 1626-1629 serve to display the tone mark 4. Note carefully that no symbol-input-end symbol has been issued to complete the input of the tone mark. If a further keystroke on key 804 were received, it would serve to further advance the order of the pre-conversion symbols of key 804, in this case returning the display to its state at step 1626. So, for instance, if the next Pinyin syllable intended by the user began with a letter on key 804, the user would need to either 1) press the time-out-kill key or 2) wait for a time out or 3) press the C-Next key in order to proceed. Any of these three options would issue a symbol-in-put-end symbol, complete the input of the tone mark, and complete a trigger sequence, causing conversion. In the case described in FIG. 16, the next syllable begins with the letter d, on key 803. Thus, at step 1630 a keystroke on key 803 is entered. This completes the trigger sequence and thus causes conversion, and has the additional benefit of beginning input of the next Pinyin syllable. The sequence di4 in display 1649 is replaced by the Hanzi shown in display 1650, and the letter d is appended to the display. This is not the Hanzi intended by the user, who thus presses the C-Next key 811 (C) at step 1631 to advance the Hanzi displayed to the intended Hanzi 1651.

Application of the preferred embodiment to Japanese. Japanese is normally written in three distinct sets of symbols: Hiragana, Katakana, and Kanji. Often, additional symbols such as Latin letters and punctuation symbols are also provided in a text-entry system for Japanese. Typically, the Kanji are input by first inputting the Hiragana corresponding to the pronunciation of the Kanji, and then converting the Hiragana to Kanji, by offering the user a choice of the (possibly many) Kanji whose pronunciation is given by the Hiragana. When Hiragana are used for both conversion and non-conversion, there are no short, simple patterns relating Hiragana which are intended for conversion to those which are not intended to be converted. In prior-art conversion systems for Japanese, sophisticated software systems are often employed to attempt to distinguish the functional roles of Hiragana-to-be-converted and Hiragana-not-to-be-converted. These systems are demanding of computing power and memory, and even with state-of-the-art software, many conversion errors will be generated by such software. In typical applications of this invention to handheld devices, very limited computing power is available, making it in-feasible to use sophisticated conversion software. These drawbacks of prior-art conversion systems are substantially eliminated by the present invention. The preferred embodiment for Japanese of the present invention involves an additional inventive step: to recognize that in prior-art systems Hiragana play two distinct roles, and it is advantageous to split these roles into two distinct symbol sets. In the present disclosure, Hiragana-not-to-be-converted will be referred to simply as Hiragana, whereas Hiragana-to-be-converted will be referred to as Kanji-Hiragana or cHiragana. The set of cHiragana includes a symbol corresponding to each Hiragana symbol which would normally be used in a prior-art system to enter the pronunciation of a Kanji. When displayed to the user, the cHiragana symbols are marked in some way which distinguishes them from the corresponding Hiragana symbols. In a visual display, the distinction could be via some characteristic of the font in which the symbols are displayed such as color, shape, alignment, style, background, underlining, etc. In an auditory display, the distinction between Hiragana and cHiragana could be marked by, e.g., a difference in pitch. It will be appreciated that other display modes would allow for still other differences between Hiragana and cHiragana to be encoded. A visual distinction could also be made by providing a sub-display to distinctively separate the cHiragana from the Hiragana as they are entered. Less preferably, Katakana symbols could be paired with Hiragana symbols to form a converting/non-converting symbol set. An alternate embodiment would use an auxiliary display to show a symbol or marking (e.g. the letter k) when a cHiragana is displayed in the main display, and a different symbol or marking when a Hiragana is displayed in the main display. If Latin and corresponding cLatin letters were used instead of Hiragana and cHiragana, then the distinction between Latin and cLatin could be marked also by a difference in case. As Japanese is normally written with two symbol sets, Hiragana and Katakana, which represent the same phonetic values, and yet are visually distinct and represent different text-entry functions, the addition of yet another symbol set which is visually distinct and represents a still other text-entry function is intuitive to the Japanese. Note that in the present discussion we will focus on the roles of the basic Hiragana, their corresponding cHiragana, and Kanji. Input of additional symbol sets such as Hiragana with diacritics, Katakana, Latin letters, and punctuation may be supported in practical implementations of this invention, according to its teachings.

Figure 18:
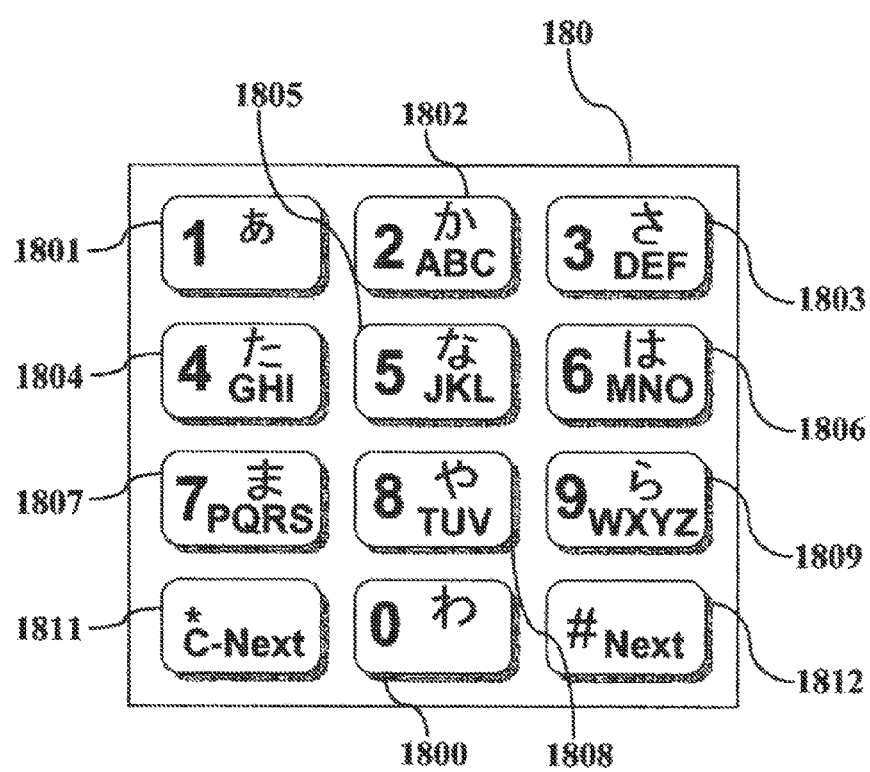
FIG. 18 is telephone keypad labeled for the entry of Hiragana, cHiragana, and Kanji using the preferred embodiment.

On prior-art telephone keypads for Japanese, Hiragana are assigned to keys in an order which obeys a modern standard. The essence of this arrangement is shown in FIG. 17. In this figure the basic Hiragana 1700 are shown in relationship to the keypad digits 1701 to which they are conventionally associated. Each Hiragana represents a consonant 1702 and vowel 1703 pair or a vowel without a consonant. A keypad design incorporating the Hiragana to key assignment of FIG. 17 is shown in FIG. 18. This figure shows a common design strategy of only labeling keys with the first Hiragana of each series of Hiragana. It is assumed that users will know the order well enough to be able to correctly guess where the other characters are located, even though they are not explicitly presented as a keypad label. Similarly, it is assumed by this design that users will be able to locate additional Hiragana which contain diacritical marks, or are smaller than the standard-sized Hiragana, etc.

In the application of the preferred embodiment to Japanese, each of the keys of FIG. 18 to which a Hiragana has been assigned will also have been assigned the corresponding cHiragana. In a fixed-order method, the Hiragana and cHiragana could be ordered with respect to each other in any way: randomly, Hiragana regularly interleaved with cHiragana, all Hiragana preceding all cHiragana, etc. Hardware methods to distinguish Hiragana from cHiragana could be applied, such as using a auxiliary shift key according to the teachings of U.S. provisional Ser. 60/111,665, PCT/US99/29,343, WIPO WO 00/35091, PCT/US01/30,264, EPO 01983089.2-2212-US0130264, which have been hereby incorporated by reference. To make the present description concrete, but without the intent of limitation, we will assume that cHiragana and Hiragana are presented in a variable order, which order depends on context according to a predictive method. The keypad of FIG. 18 is equipped with two Next keys, a Hiragana/cHiragana-Next 1812 and a Next key for conversion 1811.

Trigger sequences for Japanese. In the case of Chinese, and according to a standard method of entering Pinyin, there is one type of pre-conversion symbol which always appears at the end of a sequence of pre-conversion symbols which correspond to a given post-conversion Hanzi. This fact allows us to define a small set of trigger sequences which correspond well to intended conversions. As soon as a tone mark is input, a complete unit of pre-conversion symbols has been entered, permitting conversion to the intended post-conversion symbol, and a simple trigger sequence is sufficient to recognize this event. The case of Japanese is rather more subtle, as most pre-conversion cHiragana may appear at the beginning middle, or end of a sequence corresponding to some Kanji.

For instance, the cHiragana pronounced RI appears at the beginning of the sequence RICHI, in the middle of the sequence SHIRIZOKU, and at the end of the sequence SATORI, each of these three cHiragana sequences corresponding to a Kanji. To account for this phenomenon, the preferred trigger sequences cause triggering which is delayed until it is unambiguously clear that sufficiently many pre-conversion symbols have been input to completely define the post-conversion symbols intended to be input by the user. When the user turns attention to the entry of a non-conversion symbol, terminates text input, or otherwise turns away from entering a sequence of cHiragana, we are assured that the user considers the intended post-conversion symbols to be fully defined by the contiguous sequence of pre-conversion symbols just entered. It is at this point that conversion can preferably be triggered. From the user's point of view, this means that sequences of cHiragana spanning several post-conversion symbols may be entered before a conversion is triggered. By contrast, in the preferred embodiment for Chinese, triggering occurs after a sequence of pre-conversion symbols defining a single post-conversion symbol is entered.

In the case of Japanese, a simple set of trigger sequences contains two different classes of trigger sequences. In the first class, the first keystroke displays a cHiragana, and a second keystroke genera symbol-input-end symbol applying to the displayed cHiragana, causing it to be input. For a keystroke sequence to be a trigger sequence in the first class, the second keystroke must be on a key to which no cHiragana have been assigned. This assures that the second keystroke could not be intended to further complete a subsequence of cHiragana which follow in sequence in in any sequence corresponding to the cHiragana input by the second keystroke. For example, if the first keystroke displayed the cHiragana RI, and the second keystroke does not display any cHiragana, then the system can verify that no sequence such as RICHI is intended, and that RI must be the last cHiragana in a sequence corresponding to a Kanji, such as SATORI. Thus, conversion can be safely triggered without risk of displaying Kanji whose pronunciation has not yet been fully entered. A person skilled in the art would appreciate that an alternate embodiment would attempt to convert earlier, before the full pronunciation is entered, as in typical word-completion systems. However, such systems are difficult to use and are not preferred. There are some cases in which the second keystroke does in fact display a cHiragana, and yet the system can still verify that no further cHiragana are being input which might, in conjunction with other cHiragana already input, correspond to a Kanji intended for input. This is a case, for instance, where the second keystroke is on a key to which both cHiragana and non-conversion symbols have been assigned, and yet the user indicates, by inputting one of the non-conversion symbols on the key rather than one of the cHiragana on the key, that a complete sequence of cHiragana has been entered. For the non-conversion symbol to be input, a symbol-input-symbol applying to the non-conversion symbol must be generated. Thus, an element of the second classes is characterized in that the first keystroke displays a cHiragana, and the second keystroke generates a symbol-input-end symbol which applies to the displayed cHiragana and also displays a non-conversion symbol and a third keystroke causing said displayed non-conversion symbol to be input.

It should be evident to one skilled in the art that the two symbols entered by the second keystroke could in fact be entered using separate keystrokes, and, conversely, still other symbols might additionally be entered by the keystrokes in the trigger sequence.

It will be appreciated that the first class is very similar in operation to the trigger sequences used above in the application of the preferred embodiment to Chinese. Use of the second class of sequences is described by non-limiting example in reference to FIG. 19.

Turning then to FIG. 19 we describe the input of a section of Japanese text in which the second class of trigger sequences is used to cause conversion of cHiragana to Kanji. In this figure, Hiragana are represented by the Hiragana symbols themselves, and the corresponding cHiragana are represented by the Hiragana enclosed in a box. Beginning at step 1901, the user performs a keystroke on key 1801 to input the Hiragana symbol shown in the display 1921, which is the intended Hiragana. The keystroke 1902 displays a Hiragana which was not the one intended by the user, who then 1903 presses the Hiragana/cHiragana Next key 1812 to obtain the correct symbol in the display 1923. The next keystroke 1904 on key 1806 displays a cHiragana in display 1924. The user did intend a cHiragana, but not this one. Two keystrokes on key 1812 are required to obtain the correct cHiragana. The first 1905 displays a Hiragana 1925, and the next 1906 displays the intended cHiragana in 1926. The next keystroke 1907 displays a cHiragana in display 1927 which is indeed the correct cHiragana. The next keystroke 1908 initiates the entry of a (non-conversion) Hiragana. The Hiragana in 1928 is not the intended Hiragana, but one keystroke on key 1812 at step 1909 produces the correct Hiragana in the display 1929. Proceeding then at 1910 to enter the next symbol, a trigger sequence of the second class is formed, and conversion of the input cHiragana is performed. The result is shown in display 1930, in which the formerly displayed cHiragana are replaced by a Kanji. The keystroke forming the trigger sequence are a) any of the keystrokes 1907 or 1908, b) any of the key 1908 or 1909, and c) the keystroke 1910. In this case, the Kanji displayed as a result of trigger sequence processing is not the intended Kanji. A further keystroke 1911 on the C-Next key 1811 displays the intended Kanji in display 1931.

Multiple Next keys for pre-conversion symbols. We have already seen how multiple Next keys can be implemented to advance the symbol displayed without inputting a symbol, and where the type of symbol advanced depends on which of the multiple Next keys is activated. In the examples above, a Next key was assigned to pre-conversion symbols and another Next key was assigned to post-conversion symbols. Similarly, a separate Next key can be used for pre-conversion symbols and non-conversion symbols. This is useful when both pre- and non-conversion symbols are assigned to the same key, as is the case of the preferred embodiment as it is applied to Chinese, Japanese, and Korean. In the case of Japanese, for instance, cHiragana and Hiragana are assigned to the same keys, in a preferred embodiment. Also in a preferred embodiment, both the cHiragana and the Hiragana appear mixed in the same order when a single Next key is used to advance over both symbol sets. Preferably, when one Next key is used for Hiragana and a separate Next key is used for cHiragana, a keystroke on the Hiragana Next key presents the next Hiragana available in the fixed or variable order and a keystroke on the cHiragana Next presents the next cHiragana in the fixed or variable order. A similar effect can be achieved by implementing a symbol set selection key which allows the user to select the set of symbols to which one or more Next keys apply. For instance, a single Next key combined with a symbol set select key could be used to advance either pre- non- or post-conversion symbols, depending on the setting selected. An advantage of the multiple Next key approach taught here is that no additional keystrokes are required on a symbol set select key. A following example will illustrate the use of a separate Next key for pre- and non-conversion symbols.

The person skilled in the art will appreciate that the method can be extended further, including, for instance, a Next key for Hiragana, another one for Katakana, still another for cHiragana, another for punctuation, another for digits, etc., if representatives of each of these classes of symbols are assigned to the same key or keys.

The Iroha keypad assignments. The main advantage of the keypad labeling of FIG. 18 is that it is a well-known and standard arrangement. It has the drawback, however, that taking the diacritic and other marks into account, there are many symbols, 15 or more on some keys. This means that for both predictive and non-pretext entry, the number of keystrokes required to input a given Hiragana may be quite high. A further drawback is that the optimization method presented in GUTOWITZ (U.S. provisional Ser. 60/111,665, PCT/US99/29,343, WIPO WO 00/35091) is not naturally applicable. It is shown in that disclosure how a standard ordering can be partitioned so as to optimally reduce the number of keystrokes required to enter text, without changing the standard ordering. However, for this standard ordering of Hiragana, not only the order but also the partitioning of the Hiragana is given by a standard and little or no optimization can be done.

Both of these drawbacks can be reduced by means of a novel assignment of Hiragana to keys of the keypad herein disclosed. The arrangement is based on a well-known poem, commonly given the name Iroha. It is written using all of the Hiragana syllables (excluding syllables involving diacritics, and the symbol representing the N sound) exactly once. The order of the syllables in the poem was once used as a dictionary order, but fallen out of use for this purpose in modern times. It is first disclosed here that the Iroha ordering has surprising advantages for use in conjunction with text entry on a reduced keyboard, and patent rights for such use are hereby claimed. Using the Iroha arrangement means assigning Hiragana to keys in substantially the Iroha order, so that if all symbols are represented on the keys, the poem can be read from the keys. Following the common usage of keypad labeling, a limited subset of the Hiragana from the order may actually appear on the label, so as to not over clutter the keypad with symbols. The advantages for text entry of the Iroha arrangement include: 1) The number of symbols per key can be better balanced between keys than in the prior-art arrangement. The details of the assignment can be varied more readily than with the standard arrangement. In particular, the partition of the order can be done following word boundaries in the poem, balancing the symbol assignment across keys without unduly impairing the ability of users to memorize the assignment.

2) For the same reasons, the assignment can be optimized according the method of GUTOWITZ (wiredraws) in order to reduce the number of keystrokes required to enter text.

3) The number of keys to which Hiragana can be memorably assigned is variable. The standard ordering rigidly implies a fixed number of keys, one per linguistic group of Hiragana symbols, while the Iroha ordering can be flexibly and memorably partitioned, e.g., according to word boundaries, and one or more words can be made to correspond to each key.

Figure 21:
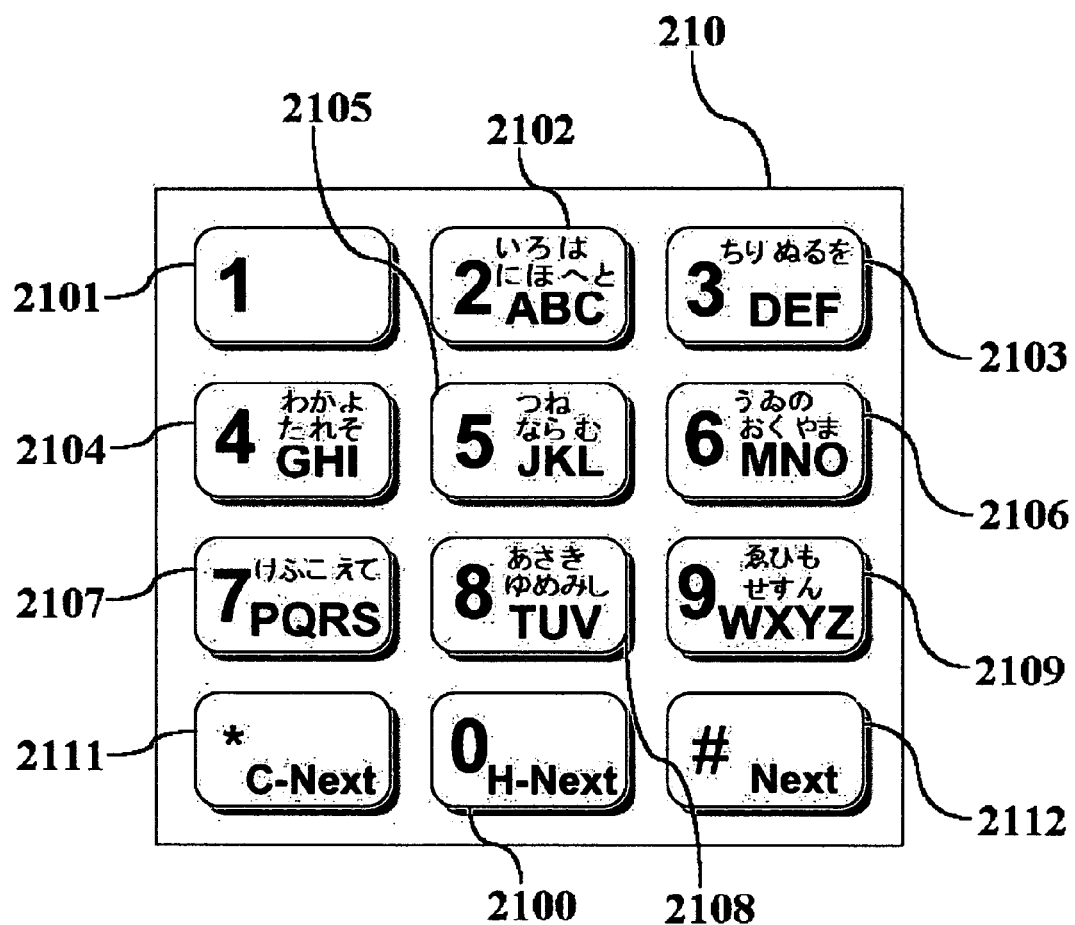
FIG. 21 is a non-limiting example of a telephone keypad labeled with an Iroha assignment.
Figure 22:
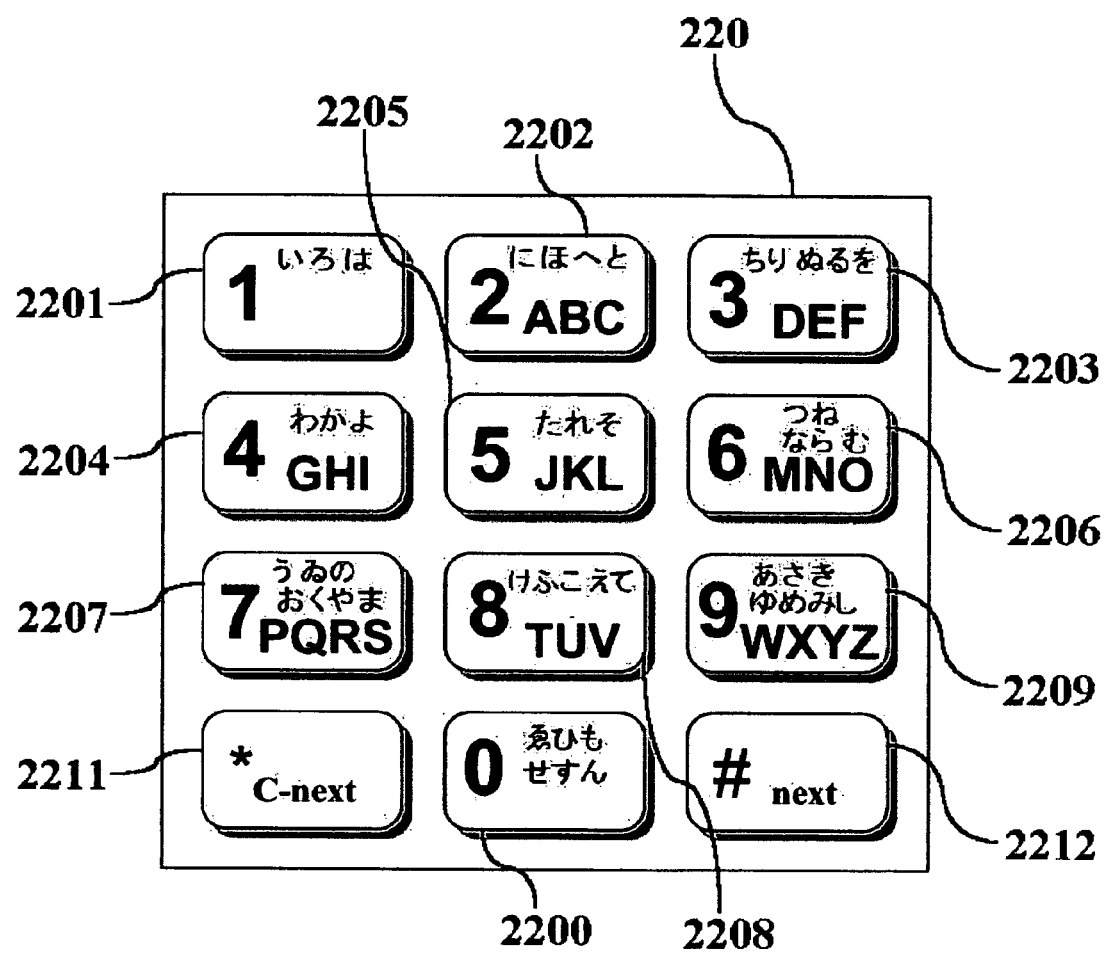
FIG. 22 is a second non-limiting example of a telephone keypad labeled with an Iroha assignment.

Referring to FIG. 20, we find a table expressing a non-limiting example of an assignment of Hiragana to keys of the telephone keypad according to the Iroha ordering. Note that, unlike the table of FIG. 17 expressing an assignment according to the standard Hiragana order, the rows and columns of FIG. 20 cannot be associated with Latin letters representing the sounds in the corresponding rows or columns. In FIG. 21 the Hiragana are assigned to 8 keys of the keypad. Turning now to FIG. 22, we see a keypad labeled according to an alternate Iroha assignment. In this case, the Hiragana are spread across 10 keys. As in FIG. 21, the assignment of Hiragana to keys respects word boundaries in the poem. It will be appreciated by one skilled in the art that 1) the number of keys bearing the Hiragana assignment may be varied within the scope of the present invention, 2) especially in view of the variations in the Iroha ordering itself according to the sources consulted, the assignment of Hiragana to keys may vary slightly while remaining within the scope of the present invention, 3) assignment of other Hiragana not appearing in the Iroha poem may similarly vary while remaining within the scope of the present invention, and 4) though under the preferred embodiment of this invention the partition of Hiragana to keys respects word boundaries in the poem, other partitions may be implemented in various trivial ways, such as partitions under which exactly the same number of Hiragana are assigned to each key. The fundamental feature of this aspect of the present invention remains, which is the assignment of Hiragana to keys in a substantially Iroha ordering.

To appreciate how a keypad labeled in a substantially Iroha ordering can be used to enter Japanese text, we turn to FIG. 23 to discuss a non-limiting example, using the keypad of FIG. 21. In this example, we see the use of three separate Next keys, a) a Next key (denoted N), corresponding to part 2112 of FIG. 21 and used to advance the display of cHiragana, a H-Next key (denoted H), corresponding to part 2100 of FIG. 21 and used to advance the display of Hiragana, and a C-Next key (denoted C), corresponding to part 2111 of FIG. 21, and used to advance the display of Kanji. The first column of this figure gives the keystrokes and the second column the resulting display. At step 2301 the user performs a keystroke on key 2108 to display the Hiragana symbol shown in display 2321. At step 2302 the user performs a keystroke on key 2106 to input the previously displayed Hiragana, and display the next desired Hiragana in display 2322. At step 2303, the user performs a keystroke on key 2109 displaying a Hiragana symbol as shown in display 2323. In this case, the user intended to input a cHiragana, which was not correctly predicted by the prediction mechanism. Thus, at step 2304 the user presses key 2112 to advance the display to the first cHiragana in the order given by the predictive mechanism. As this is not the intended cHiragana, the user, at step 2305, presses key 2112 to further advance the display to the next cHiragana predicted by the predictive mechanism. At step 2306, the user presses key 2102 to input the next intended cHiragana. In this case the predictive mechanism does select the intended cHiragana, as displayed in display 2326. At step 2307, the user again presses key 2102, this time with the intent of inputting a Hiragana. The predictive system chooses a Hiragana for display, as shown in display 2327. However, this is not the intended Hiragana. Thus, at step 2308, the user presses key 2100 to advance the display to the next, and intended, Hiragana, as shown in display 2328. At step 2309, the user presses key 2107 which displays a cHiragana as shown in display 2309. This keystroke completes a trigger sequence. Thus, the two cHiragana shown in display 2328 are converted to a Kanji, as shown in display 2329. This is not the Kanji intended by the user who proceeds, at step 2310 to press key 2311 (C-Next) to advance the display to the next Kanji given by the mechanism. The final state of the display is shown in display 2330.

Preferred Embodiment for Korean.

Input of Korean using the preferred embodiment is very similar to input of Japanese. Korean is typically entered using Jamo which correspond for present purposes to Hiragana in that they are used to specify the pronunciation of the post-conversion Hanja which correspond in turn to Japanese Kanji. While Kanji are essential for writing good Japanese, Hanja can often be dispensed with in writing good Korean. Nonetheless, Korean and Japanese are similar in that in prior-art text entry system the Jamo and Hiragana play the role of both pre-conversion symbols and non-conversion symbols. This makes Korean and Japanese similar from the point of view of implementing and using the preferred embodiment. One skilled in the art will appreciate that a difference between Jamo and Hiragana is that Jamo are typically converted to Hangul upon entry, the Hangul being packages of Jamo arranged spatially in a particular way to visually represent syllables. The Jamo-Hangul conversion is independent of the Jamo-Hanja conversion and is carried out by algorithms well known to those skilled in the art. Thus the Jamo-Hangul conversion will be ignored in the following, for the sake of clarity of presentation. Jamo-Hangul conversion could also be implemented in the preferred embodiment, operating on pre-conversion symbols or non-conversion symbols, or both.

According the teachings of this inventions, a text-entry system for Korean comprises non-conversion symbols comprised of Jamo, pre-conversion symbols comprised of cJamo, and post-conversion symbols comprised of Hanja, a mechanism to display the symbols, and a mechanism to recognize trigger sequences. There are at least two classes of trigger sequences. In the first class, trigger sequences comprise a first keystroke which displays a cJamo, and a second keystroke which generates a symbol-input-end symbols which applies to the displayed cJamo. If the second keystroke is on a key to which no cJamo have been assigned, then conversion is trigger when these keystrokes are entered. Trigger sequences in the second class are characterized in that the first keystroke causes the display of a cJamo, and the second keystroke generates a symbol-input-end symbol which applies to the displayed cJamo and also displays a non-conversion symbol, such as a Jamo and a third keystroke which generates a symbol-input-end symbol which applies to the displayed non-conversion symbol causing it to be input.

In order to present a non-limiting example of text input for Korean using the preferred embodiment we need to choose an assignment of Jamo and cJamo to the keys of a text-input device.

Figure 24:
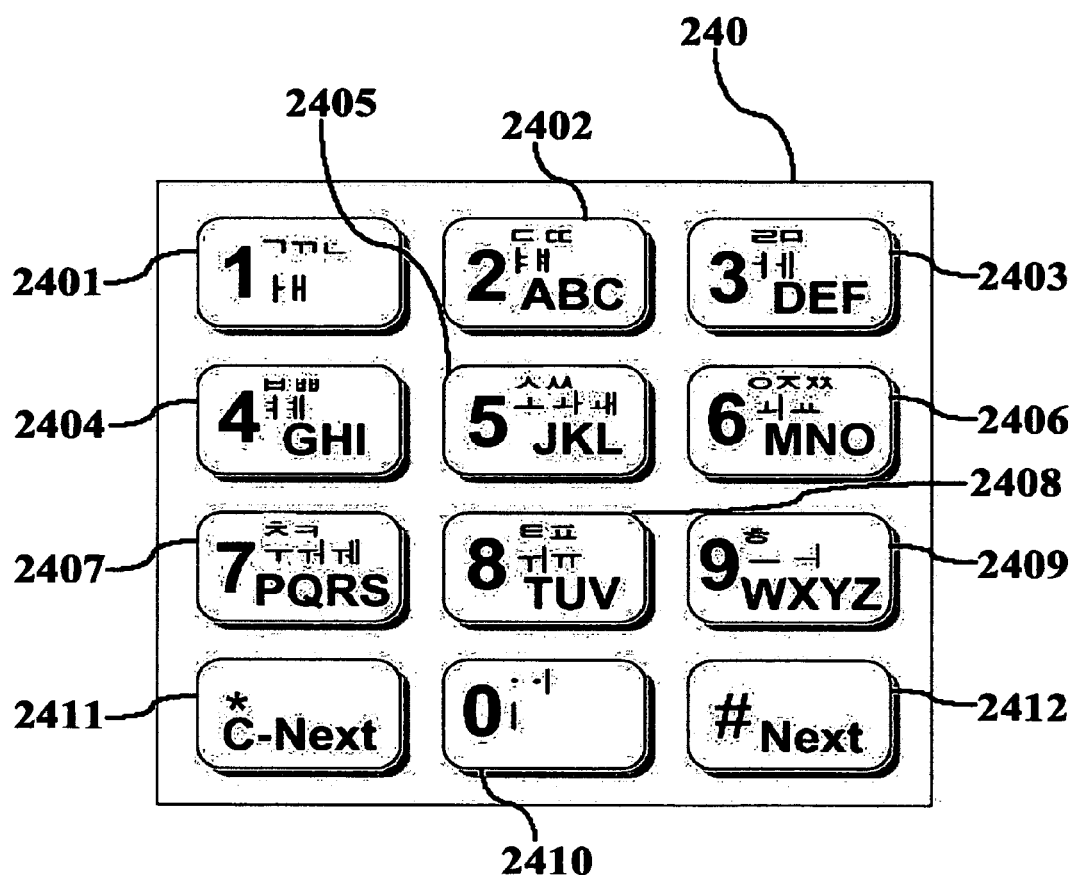
FIG. 24 is a keypad labeled for entry of Korean using the preferred embodiment.

FIG. 24 shows a telephone keypad to which Jamo, cJamo, and other symbols have been assigned. In this example, the Jamo are labeled in the South-Korean order across the keys, with consonants on the top row and vowels on the second row. A person skilled in the art will recognize that the present invention is not limited by the assignment or arrangement shown. It is understood that both cJamo and the corresponding Jamo are assigned to the same key. Other arrangements are possible, but this is the preferred arrangement.

Figure 25:
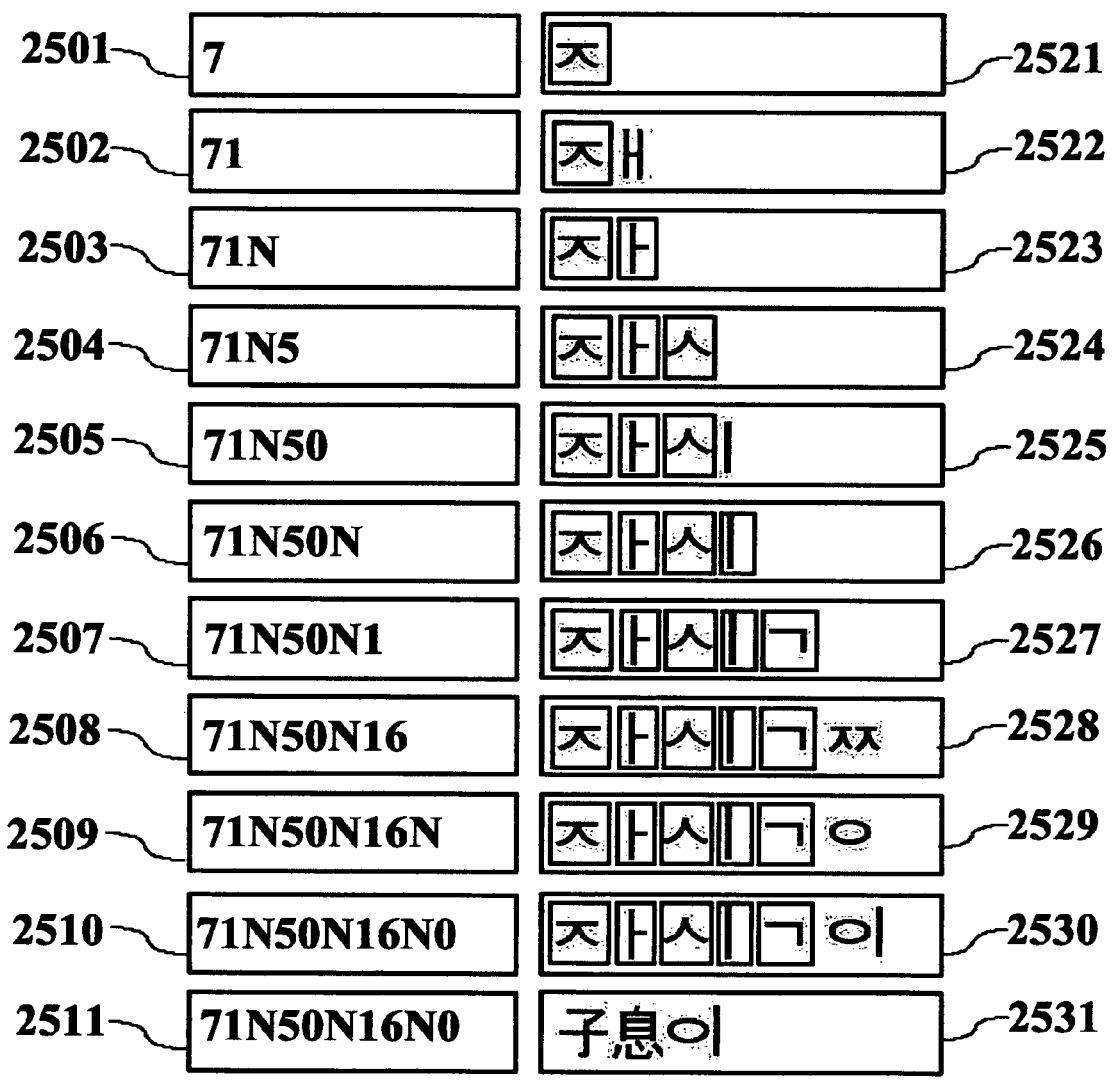
FIG. 25 is a non-limiting example of entry of Korean using the preferred embodiment.

Turing then to FIG. 25, we examine in detail a non-limiting example of entry of Korean text using the preferred embodiment. As in similar figures, such as FIG. 23, the first column show the keystrokes entered (in the case of FIG. 25, the keystrokes are on the keypad of FIG. 24), and the second column shows the resulting displayed symbols. cJamo are shown enclosed in a box, and regular Jamo are shown without a box. In this example, we consider a system in which a predictive system is used for both pre- and post-conversion symbols. This example is further characterized in that Next key advance is used for both pre- and post-conversion predictive systems. A keystroke on the Next key for pre-conversion is shown by capital N, and a keystroke on the Next key for post-conversion is shown by a capital C. For clarity, the operation of any algorithm to package Jamo and/or cJamo into corresponding Hangul has been suppressed, and the Jamo and cJamo are shown linearly, in the order in which they are displayed. Thus, at step 2501, key 7 is pressed, resulting in the cJamo shown in the display 2521. This is the cJamo intended by the user, who proceeds, at step 2502, to attempt to enter the next cJamo. The pre-conversion system does not present the correct cJamo but rather a Jamo assigned to the same key as the intended cJamo. Note that no element of either class of trigger sequences has yet been entered. A trigger sequence of the first class has not been entered since the pressed key, 1, has cJamo assigned to it. A trigger sequence of the second class has not been entered since the non-conversion Jamo has been displayed, but is not yet input. In this example there are no further classes of trigger sequences to examine. The correct cJamo is not presented by the prediction system, so at the next step 2503, the user presses the Next key to display the correct cJamo in dis2523. Continuing in this way, the user enters the cJamo required to specify a second Hanja in steps 2504-2507. The reader may verify that at none of these steps is a trigger sequence entered. At step 2508, all of the cJamo for the desired block of Hanja have been entered, and the user proceeds to enter a Jamo. The intended Jamo is not correctly predicted by the text-entry system which displays another Jamo in the display 2528. The user presses the Next key to change the displayed Jamo to the intended Jamo at step 2509. In this case, a single press of the Next key was sufficient to display the intended Jamo. The user proceeds at step 2510 to enter a second Jamo. This keystroke finally completes a trigger sequence, of the second class, since the keystroke not only displays a Jamo, it also generates a symbol-input-end symbol which applies to the last symbol entered, a (non-conversion) Jamo. Thus the conversion mechanism is triggered, and replaces the five cJamo displayed in display 2530 with the two Hanja displayed in display 2531. This conversion did not require any explicit "convert" signal from the user, who simply continued to enter the intended Jamo and cJamo.

Note that this non-limiting example is presented to particularly point out features of the invention. It will be appreciated that many aspects of the example could be changed and yet remain within the scope of the invention. For instance, either the non-conversion or pre-conversion symbols could be Latin letters or some other symbol set. A prediction system on pre- or post-conversion symbols was not required, an algorithm to package Jamo into Hangul could have be simultaneously operative with the operations of the invention, the assignment of Jamo and cJamo to keys could have been different, etc.

Remote conversion. Predictive systems for post-conversion symbols seek to reduce the keystrokes required for the user to input desired post-conversion symbols. Even with a good predictive system for post-conversion symbols, it may be necessary for the user to occasionally adjust predictions, for instance using a C-Next key as has been shown in several non-limiting examples. The computational requirements for a good post-conversion predictive system may be quite high. A further inventive step according to the teachings of this invention is to substantially eliminate the need for post-conversion keystrokes, and to substantially eliminate the computation requirements in the user's input device. The key insight is that by inputting information distinguishing pre-conversion from non-conversion symbols, e.g. cHiragana from (non-conversion) Hiragana, the user has substantially increased the likelihood that a fully automatic conversion system of sufficient power produce effectively error-free conversion. For example in the case of Japanese, prior-art conversion systems must decide, for each Hiragana entered if a) the Hiragana is meant to be part of the pronunciation of a Kanji or to be represented in the text as a Hiragana, and b) if the entered Hiragana is mean to be converted to a Kanji, which Kanji symbol is meant? The ambiguity due to these combined decisions limits the effectiveness of even the powerful and resource-demanding conversion systems. By distinguishing cHiragana from Hiragana at the time of input, the user creates an input sequence which is much easier to disambiguation. Therefore, we claim a system in which an output stream of non-converted or partially converted symbols, comprised, e.g. in the case under discussion, of cHiragana and Hiragana, and potentially other symbols as well. The user does not attempt to convert all of the cHiragana, but instead relies on a remote server to do the processing. As the remote server is not under the same cost and size constraints as the (typically handheld) input terminal, the remote server can be an arbitrarily powerful computer running arbitrarily sophisticated software. Therefore, the remote server can operate on the input stream to process conversions. The substantially fully converted input stream can than be passed on for further processing, such as sent to the target recipient of a message.

Figure 26:
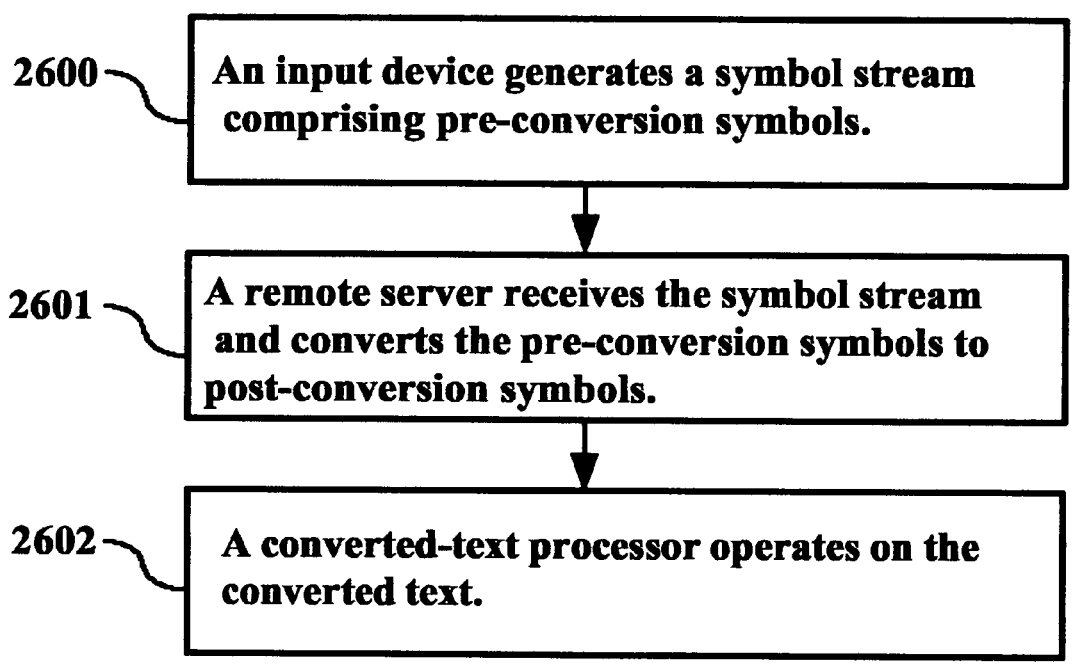
FIG. 26 is a flow chart providing an overview of client-server conversion.

The operation of this system may be appreciated more fully by reference to FIG. 26. where an input device 2600 generates a symbol stream comprising pre-conversion symbols. This symbol stream is passed to a remote server 2601 which converts substantially all of the pre-conversion symbols to post-conversion symbols. The converted text is passed on to a converted-text processor 2602, which could be, e.g., a display terminal attached to the remote server, a storage device attached to the remote server, or a further remote terminal. It should be noted that the conversion process on the remote server could be customized according to user preference. For instance, in the case of Korean, the choice of Hanja to be converted or left in the form of Hangul symbols is a stylistic choice. Increased use of Hanja is considered by some to be more literary or educated. Thus a user preference could be set to determine the writing style as expressed in the way pre-conversion symbols are converted either to post-conversion symbols, or rather to non-conversion Hangul. It will be appreciated that the same sort of customization could be done on the user's own input terminal rather than at the remote server, however such customization may require computational power which is unavailable at the user terminal.

Error correction and implied trigger sequences The trigger sequence method is presented above in an idealized context in which text is always correctly entered by the user, and thus correct trigger sequences are entered whenever conversion would normally be desired. In practice, this may not be the case, and some mechanism could be proto correct for errors and omissions by the user. For instance, in Chinese, if the user should have entered a Pinyin sequence such as shang1wen4 but omitted the tone mark 1, writing instead shangwen4, it might still be possible for error-correcting software to reliably supply the missing tone mark, using string-matching algorithms well-known to those skilled in the art. This is due to the fact that the sequence shangwen4 would not occur in ideal text entry using this text-entry system, and shang1wen4 may well be the most likely ideal sequence which is similar to the actually entered sequence. The error-correction software matches the ideal sequence which contains a defined trigger sequence to the actually entered sequence and thus provides an implied trigger sequence effective to trigger conversion to the mechanism effective to recognize and process trigger sequences. Depending on the computing resources available in the device in which the text-entry system is implemented, error-correcting mechanisms may be arbitrarily sophisticated and powerful.

It should be emphasized that the above-descried embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein with the scope of the disclosure and the present invention and protected by the appended claims.

What is claimed is:

1. A text-entry system based on trigger sequences comprising:
   1) a plurality of keys,
   2) a plurality of printable symbols, said plurality of printable symbols comprising a set of pre-conversion symbols, a set of post-conversion symbols and a set of non-conversion symbols, such that at least one of said plurality of keys is assigned more than one pre-conversion symbols of said set of pre-conversion symbols, and such that at least one fixed sequence of keystrokes corresponds to more than one sequence of said pre-conversion symbols, and each post-conversion symbol of said set of post-conversion symbols being set in a correspondence to at least one pre-conversion symbol, wherein said set of said pre-conversion symbols is disjoint from said set said of post-conversion symbols such that no sequence of pre-conversion symbols is equal to any sequence of post-conversion symbols;

3) a plurality of non-printable symbols, each of which is generated by a keystroke on any one of said plurality of keys, including at least one key of said plurality of keys also having at least one of said pre-conversion symbols or at least one of said non-conversion symbols assigned to it, the plurality of non-printable symbols including a plurality of non-printable symbol-input-end symbols, wherein each non-printable symbol-input-end symbol generated by said at least one key is always generated if and only if one of said at least one of said pre-conversion symbols or said at least one of said non-conversion symbols assigned to said at least one key is displayed in response to a same keystroke which generates said non-printable symbol-input-end symbol;
   4) a display to display said plurality of printable symbols,
   5) a first mechanism to display said plurality of printable symbols in response to keystrokes, and
   6) a second mechanism to recognize, upon generation of a non-printable symbol-input-end symbol of said plurality of non-printable symbol-input-end symbols, trigger sequences of keystrokes and thereby trigger conversion of m pre-conversion symbols displayed on said display to n post-conversion symbols intended for display on said display, wherein m and n are integers, m≧1, n≧1, and m≧n;
   wherein each trigger sequence of keystrokes has two parts:
   a) a first part comprising only keystrokes that are minimally required to display said m pre-conversion symbols, said m pre-conversion symbols corresponding to said n post-conversion symbols intended for display on said display, wherein said first part does not comprise a keystroke indicating an end to the entry of keystrokes corresponding to said m pre-conversion symbols, in addition to the minimally required keystrokes to display said m pre-conversion symbols; and b) a second part including a keystroke on said at least one key, said keystroke triggering conversion of said m pre-conversion symbols into said n post-conversion symbols and at the same time displaying said n post-conversion symbols intended for display together with a pre-conversion symbol or a non-conversion symbol assigned to said at least one key.

2. The text-entry system of claim 1 further characterized in that:
   1) said set of pre-conversion symbols comprises tone marks and symbols selected from a set of
      Latin symbols and
      Bopomofo symbols,
   2) said set of post-conversion symbols comprises Hanzi, and
   said m pre-conversion symbols comprise a tone mark.

3. The text-entry system of claim 1 further characterized in that:
   1) said pre-conversion symbols comprise cHiragana,
   2) said post-conversion symbols comprise Kanji, and
   3) said non-conversion symbols comprise Hiragana.

4. The text-entry system of claim 1 further comprising a third mechanism to convert said m pre-conversion symbols to said n post-conversion symbols upon recognition of a trigger sequence of said set of trigger sequences by said second mechanism.

5. The text-entry system of claim 4 further characterized in that said third mechanism is physically remote from said first mechanism.

6. The text-entry system of claim 1 further comprising a predictive text mechanism operating to select said m pre-conversion symbols for display, said m pre-conversion symbols for display being the most likely m pre-conversion symbols for display based on the first part of a trigger sequence.

7. The text-entry system of claim 1 further comprising at least one Next key for incrementing symbols in an ordered list containing more than one element, said Next key characterized in that a keystroke on said Next key does not generate a symbol-input-end symbol.

8. The text-entry system of claim 1 further comprising a multi-tap mechanism for incrementing symbols in an ordered list containing more than one element.

9. The text entry system of claim 2 further characterized in that each time one of said tone marks is displayed, it is only displayed after a plurality of said Latin symbols have been displayed but not input.

10. The text-entry system of claim 1 further comprising:
    a first Next key applying to a plurality of said pre-conversion symbols such that a keystroke on said first Next key advances said pre-conversion symbols in an order, and
    a second Next key applying to a plurality of non-conversion symbols such that a keystroke on said second Next said key advances said non-conversion symbols in an order,
    said first Next key characterized in that a keystroke on said first Next key does not generate a symbol-input-end symbol,
    and said second Next key characterized in that a keystroke on said second Next key does not generate a symbol-input-end symbol.

11. The text-entry system of claim 3 further characterized in that a plurality of said pre-conversion symbols are assigned to said keys in a substantially Iroha ordering.

12. The text-entry system of claim 1 further comprising an assignment of cHiragana to said plurality of keys in a substantially Iroha ordering.

13. The text-entry system of claim 1 further comprising a word-based predictive mechanism.

14. The text-entry system of claim 13 further comprising a word-completion mechanism.

15. The text-entry system of claim 2 further characterized in that said tone mark appears in said order after any of said Latin symbols in said order.

* * * * *